United States Patent [19]
Allen

[11] Patent Number: 5,835,482
[45] Date of Patent: Nov. 10, 1998

[54] COMMUNICATION SYSTEM AND METHOD PROVIDING OPTIMAL RESTORATION OF FAILED PATHS

[75] Inventor: John David Allen, Garland, Tex.

[73] Assignee: MCI Communications Corporation, Washington, D.C.

[21] Appl. No.: 715,323

[22] Filed: Sep. 18, 1996

Related U.S. Application Data

[60] Provisional application No. 60/000,491 Sep. 22, 1995.
[51] Int. Cl.[6] ................................................ H04L 12/24
[52] U.S. Cl. .......................... 370/225; 370/400; 340/827
[58] Field of Search ............................... 370/16, 16.1, 54, 370/60, 60.1, 94.3, 216, 217, 218, 225, 351, 400; 371/8.2, 11.2; 379/16, 221; 340/825.01, 827; 455/8; 395/182.02

[56] References Cited

U.S. PATENT DOCUMENTS

| | | | |
|---|---|---|---|
| 4,956,835 | 9/1990 | Grover | 370/16 |
| 5,235,599 | 8/1993 | Nishimura et al. | 371/11.2 |
| 5,495,471 | 2/1996 | Chow et al. | 370/16 |
| 5,513,345 | 4/1996 | Sato et al. | 395/182.02 |

*Primary Examiner*—Hassan Kizou

[57] ABSTRACT

To restore partial outages within a communication network having numerous switching nodes and links interconnecting the nodes, a three-stage distributed restoration protocol is activated to use spare links to bypass failed links and restore normal network connectivity. The three-stage protocol detects and resolves contention for spare resources among separate restoration processes and is therefore particularly advantageous in the event of multiple simultaneous network failures. A conservative flooding approach is used during the first forward signalling stage. Data elements added to the forward signals convey the likelihood that the path will be needed for restoration. The second reverse signalling stage uses reverse signals with attached contention data to detect contention among separate processes for spare resources and to alert the respective processes. The final path implementation stage involves reviewing the reverse signals and using the attached contention data to make informed choices of restoration paths that result in the highest degree of overall network restoration. The present invention, including node logic and specific signal structures and multiple-pass signalling, allows for shared awareness among diverse restoration processes so that they may work collectively to best utilize available spare resources.

27 Claims, 22 Drawing Sheets

COMMUNICATION SYSTEM AND METHOD PROVIDING OPTIMAL RESTORATION OF FAILED PATHS

FIELD OF THE INVENTION

This application claims priority benefit of U.S. Provisional Application Ser. No. 60/000,491, filed Sep. 22, 1995.

This invention relates to restoring traffic flow in a telecommunications network in the event of partial outages and more specifically to a system and method for rerouting of traffic over alternate network paths in a manner that makes best use of overall network capacity.

BACKGROUND OF THE INVENTION

Communications networks provide a means of dynamically routing information, usually represented by time-domain electrical signals, from any point in the network to another selected point within the network. A typical communications network, such as one used for routing of telephone calls, consists of two or more nodes and links that connect the nodes. Each link serves to carry information between two particular nodes. Each node typically contains some means for switching a stream of incoming data from one link onto one of many outgoing links. Each node thereby performs routing of data to various other nodes connected via the associated links. A given node may also provide means for data to enter or exit the network such as when data is originated by one network subscriber, submitted to the network to be transported, and leaves the network upon reaching a destination.

The arrangement of nodes and links in a network can vary widely subject to the required volume of data flow between points that the network serves. Network topology can even change as the network is extended or reconfigured to handle greater data volumes or cover broader territory. Nodes are often connected by a multiplicity of parallel links due to the need for capacity. In addition, redundant spare links are commonly added between nodes with the intent that they usually carry no data traffic but may be used as alternate routes in the event of partial network failure. One or more links joining the same two adjacent network nodes are collectively referred to as a span.

Communication networks in general are being called upon to carry progressively larger volumes of data. These data may represent any combination of telephony, video, or computer data in a variety of formats.

The information traffic of even a single network data path represents a formidable volume of vital information flow. Sudden failure of such an information channel can cause a significant loss in revenues for a network owner and loss of commerce and other benefits for the network users.

Consequentially, techniques have been devised for assuring that, when one network path fails, other, usually spare, paths are used to circumvent the failure and restore normal traffic flow as quickly as possible. Among the automatic restoration techniques, there are two common approaches—centralized and distributed.

The centralized approaches rely upon a central database that is accessed by all the switching nodes. In the variations on this approach, this central database contains information either regarding the overall network topology, or about preplanned actions in the event of specific failures, or both. These approaches suffer due to a) the need to constantly update the database as the network is enlarged or reconfigured and b) the delay through, and potential failure of, communications links that join the switching nodes to a central database or a network control center.

The distributed approaches are characterized by the use of self-contained operating logic within the switching nodes that form the network. Generally, a distributed restoration approach does not use a centralized database but instead relies upon node logic acting upon local information via connections to adjacent nodes. The intent of these approaches is to use the network itself as the data processing matrix upon which to compute the optimal restoration routes. A well known distributed restoration technique is taught by Wayne D. Grover in U.S. Pat. No. 4,956,835 and is commonly referred to as "Selfhealing Networks" (TM) or SHN. This technique establishes a protocol consisting of restoration-specific data structures that are communicated through the network, operating logic within each network node, and a defined sequence of network events to accomplish restoration.

The present invention is an enhancement upon the SHN protocol. Therefore, a brief description of the SHN protocol is appropriate here to preface the discussion of the present invention and its advantages.

The SHN technique assumes the network can detect failure of a particular link by various means that are well known to those skilled in the art. It is further assumed that both nodes adjacent the failed linked are aware of the identity and condition of the particular failed link. In the SHN terminology, the two nodes on either end of a link that fails are referred to as the custodial nodes of that link.

Intrinsic to the structure and routing functions of such communications networks of the present invention, a selection of any single logical or physical link connected to a given node uniquely identifies an adjacent node in the network. Thus, one custodial node aware of a specific failed link inherently knows the identity of its corresponding adjacent custodial node.

Upon failure, the two custodial nodes adopt two different roles in the SHN restoration protocol. One node becomes the initiator of special network signals described below—it becomes what is called the Sender. The other node takes on the role of Chooser. Which node fulfills which role is decided at the time of failure based upon some simple criterion such as comparison of assigned unique node ID numbers i.e. higher number is always Sender.

The search for viable alternate paths then proceeds as follows:

The Sender emits a data signal along spare links in all spans to which it is connected. This special data signal, called a restoration signature, contains information that indicates that it is restoration-related and contains data fields that identify the Sender and Chooser. Other nodes that receive this type of signal further propagate the signal along other spare links to which they are connected. Thus, the original signatures from the Sender are broadcast throughout the network by a technique known as flooding.

Eventually, one or more of these signatures reaches the Chooser node, which became receptive to such signals at the instant of link failure. Each intermediate node that conducts signatures between the Sender and Chooser nodes is said to adopt the role of a Tandem node in the terminology of the SHN protocol.

The Chooser node collects and reviews the incoming signatures that may arrive via several different routes and applies some logical scheme to select a suitable path over which to reconnect traffic between itself and the Sender.

Upon selecting a suitable restoration path, the Chooser sends a reverse signature back along the selected path to convey its selection and trigger switching within the network nodes necessary to implement the selected path. The intervening Tandem nodes recognize the return signature and perform both switching and propagation of the return signature in such a way as to secure the path that ultimately joins Sender to Chooser to complete the restoration. This technique is applied independently for every separate link that fails. Such failed links are often restored over completely separate routes through the network depending on availability of spare links. If failures occur along more than one logical span, then separate instances of the SHN protocol are initiated to restore failed links in each span.

The logic applied within the Sender, Chooser, and Tandems, as well as the data contained within the signatures and the temporal sequencing of network events constitute the basic SHN protocol. Alternative or hybrid approaches within all of these aspects of the SHN protocol account for the many variations proposed by other inventors in this field to optimize some characteristic of the restoration process— namely speed, maintainability, efficiency, or optimal use of spare network capacity. The present invention substantially changes the basic SHN protocol with the overall goal of improving optimal use of network capacity in the event of multiple span failures within the network.

SUMMARY OF THE INVENTION

The specific goal of the present invention is to improve the handling of contention for spare links as multiple restoration processes try to restore multiple failures within a single network. A communication network embodying the present invention offers the advantage that, in the event of multiple span failures, choices of restoration paths make good use of network spare capacity rather than seeking locally optimal paths that may preclude complete network restoration. Numerous characteristics differentiate the present invention from the cited prior art, including path selection by the Sender rather than the Chooser, labeling of ports denoting tentative usage, conservative flooding logic with intelligent outgoing port selection, and protocol extensions for communicating contention data among separate restorative processes.

The manner in which the present invention coordinates these aspects to resolve contention for spare links, as well as further features and advantages, is best understood by examining the following detailed written description and accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4a is a flow chart illustrating the prior art distributed restoration technique from which the instant invention is an improvement of;

DETAILED DESCRIPTION OF PREFERRED EMBODIMENT

In the discussion that follows, signals may also be referred to as signatures or messages. While there is a subtle difference among these terms to those skilled in the art, the differences are implementation-specific issues that do not affect the scope and spirit of the present invention. For the purposes of describing the invention herein, the terms signal, signature, and message are all understood in a broad sense simply as conveyances of data. Even though the data elements to be carried are exactly specified in accordance with the present invention, the mechanisms for transporting and processing, e.g. queued messages versus signatures imbedded in unused fields of the transport protocol, are presumed irrelevant.

A port becomes unavailable in the present context whenever it is either disabled or is actively carrying network traffic. Spare ports can become unavailable during restoration processing as they become part of a chosen restoration path and begin carrying active traffic.

Figure 1:
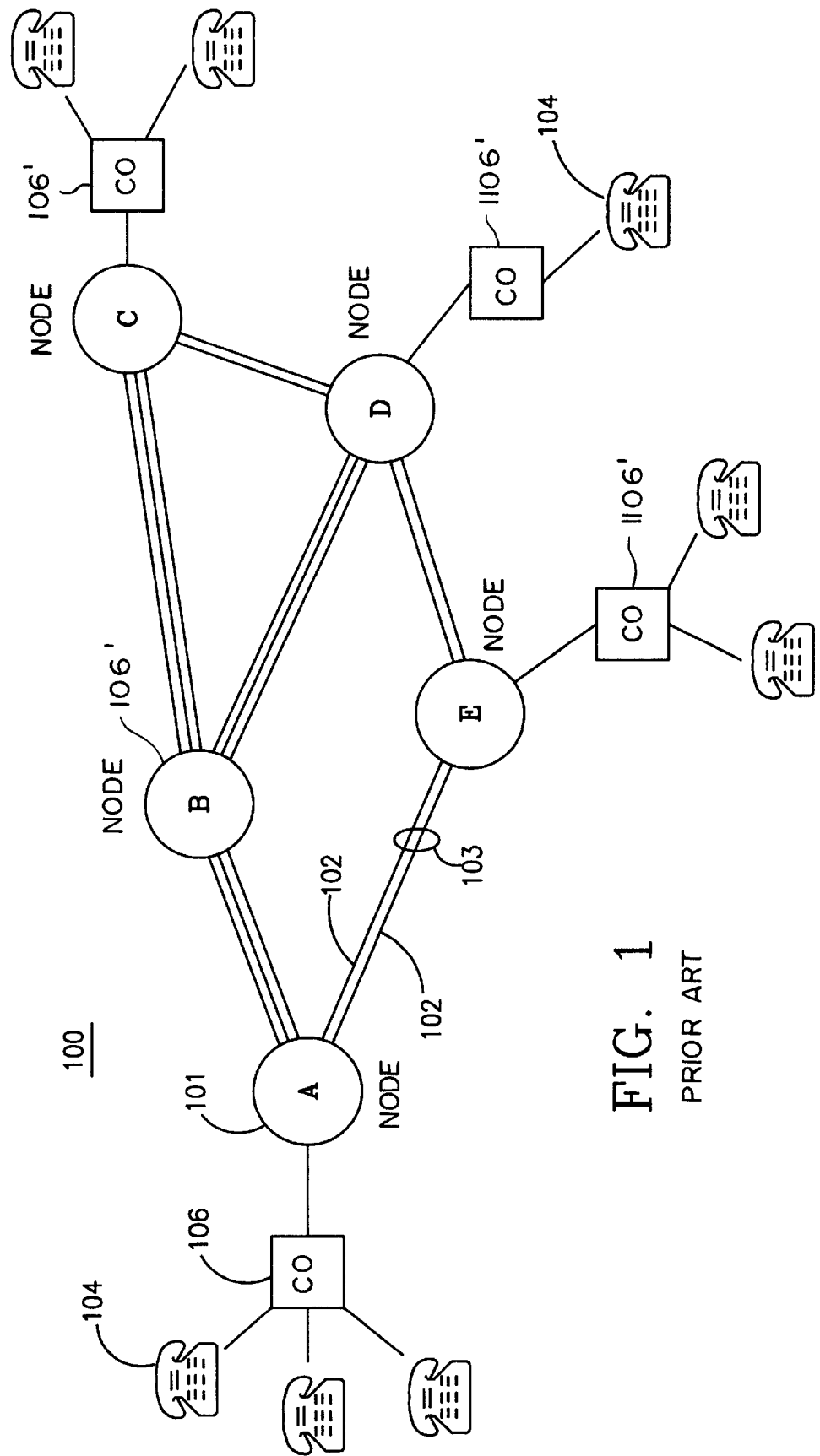
FIG. 1 is an illustration of a typical communications network constituting an embodiment in which the present invention may be employed.

Referring now to the figures, and in particular to FIG. 1, a networked communication system 100 is depicted in which the present invention may be employed. The system 100 consists of nodes 101 (101') and links 102 that carry data between nodes 101. In the example of FIG. 1, the communications system 100 routes telephony data so as to effectively interconnect various subscribers 104 that interface to the network via a central office 106 (106'). This routing is accomplished within the network by the ability of each node 101 to perform a one-of-many switching function, that is, to accept data entering along one link and send the data out along a different link. Under normal circumstances, the switching within each node is directed by some overall network routing logic commonly understood by those skilled in the art. An example of a typical commercially available switch that can serve as a node 101 in reduction to practice is the Model 1633-SX Digital Cross-Connect Switch manufactured by Alcatel Network Systems. Some other equivalent or analogous switching apparatus may be used in a network to which the present invention is applied without altering the spirit and scope of the present inventive concept.

One or more links that connect two nodes are said to constitute a span 103. Note that a span may consist of numerous links and that, in practical use, many of the links in a span may be designated as spare links that do not carry traffic under normal circumstances but may be called upon to do so if other links within the network fail. This spare link capacity, coupled with the switching ability within the network nodes, allows the network to use rerouting to recover from partial failures by circumventing the failed network elements. The specific logic and protocol applied in making switching decisions to accomplish said rerouting is the realm of the present invention.

Figure 2A:
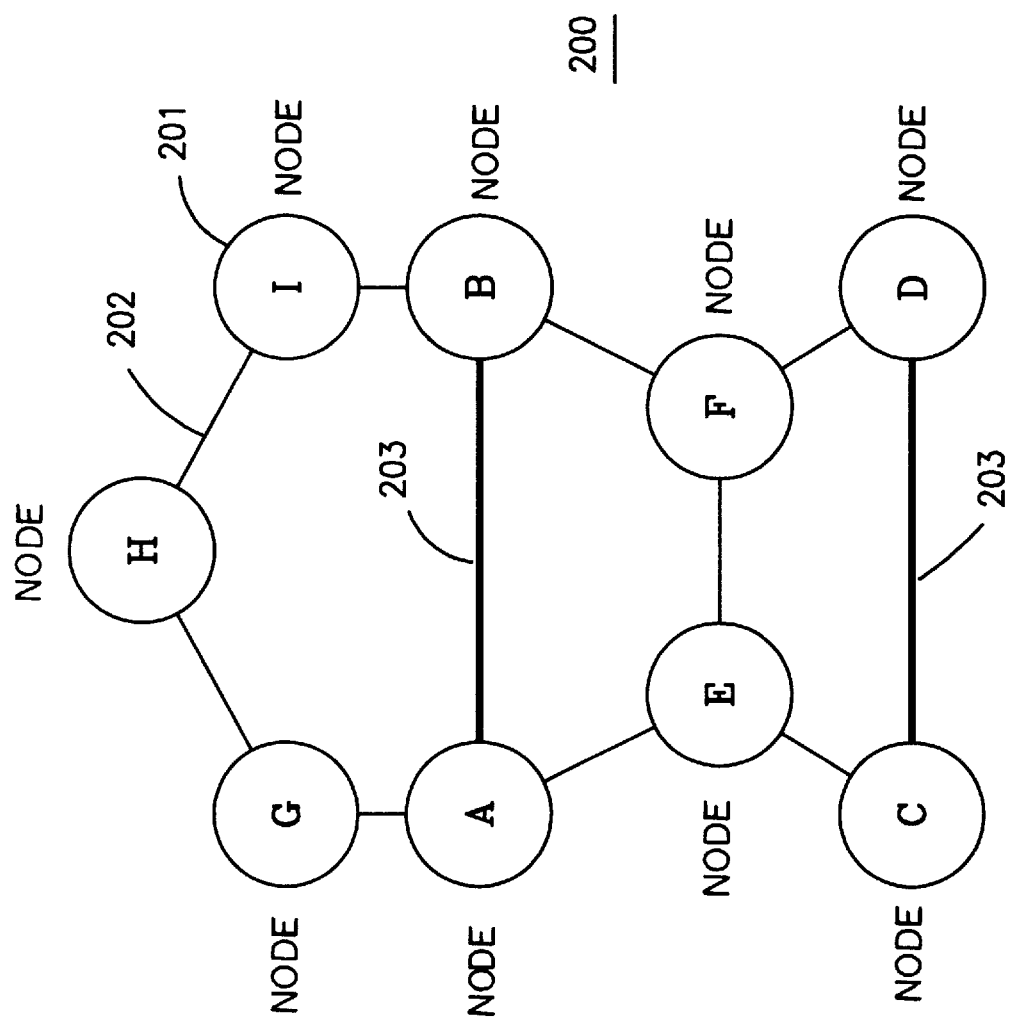
FIGS. 2A–2F illustrate an example network with various conditions of failed links and corresponding restorative paths.

Referring now to FIG. 2A, a particular communications network 200, or relevant portion thereof, is depicted consisting of nodes 201, normally traffic-bearing links 202, and spare links 203. Other links that may normally carry traffic and be logically superimposed upon this network depiction are omitted for purposes of clarity.

Figure 2C:
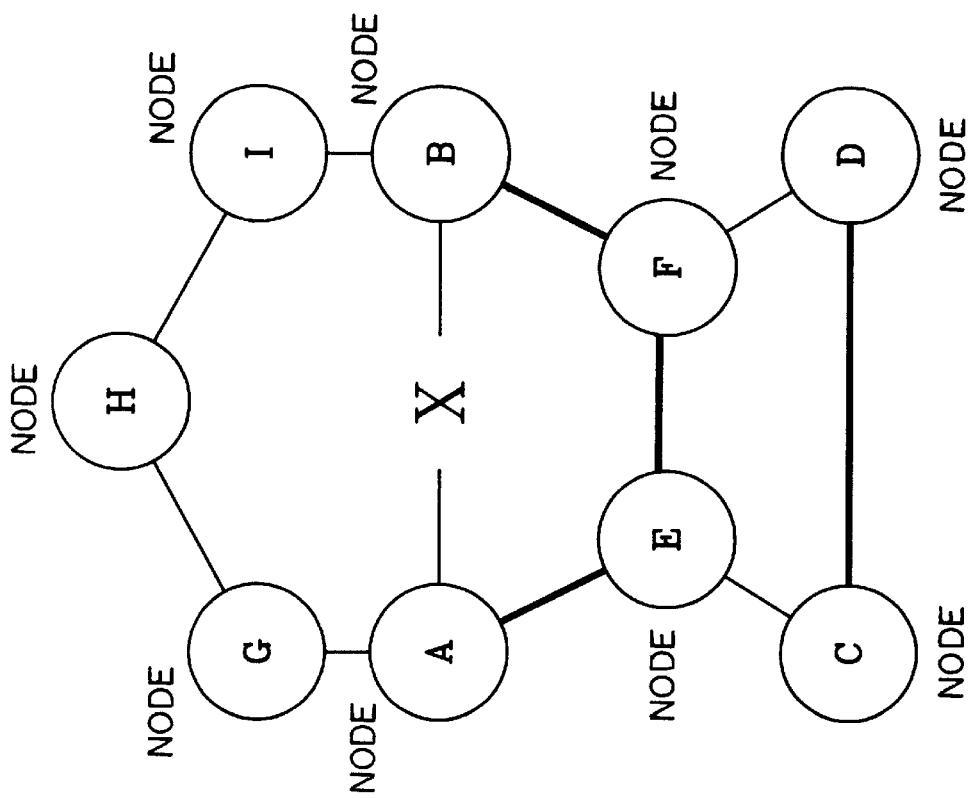
Figure 2B:
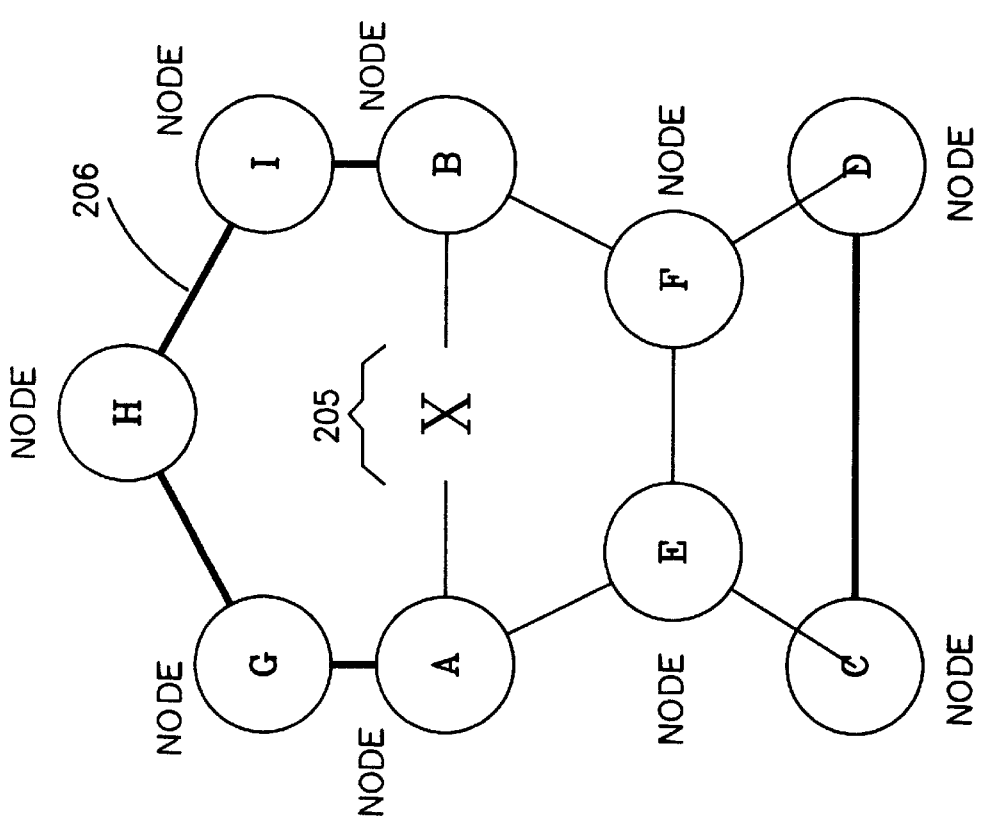

FIG. 2B depicts the same network as in FIG. 2A after having undergone a failure of the link that normally carries traffic between node A and node B. This figure also represents a selection of spare links, along nodes A-G-H-I-B, that will restore the connection from node A to node B.

FIG. 2C shows a failed link between node A and node B similar to FIG. 2B, but shows an alternate restoration path of A-E-F-B. Given the two alternate restoration paths in FIGS. 2B and 2C, the latter A-E-F-B path is preferred by the prior art restoration approaches due to the shorter path length.

Figure 2E:
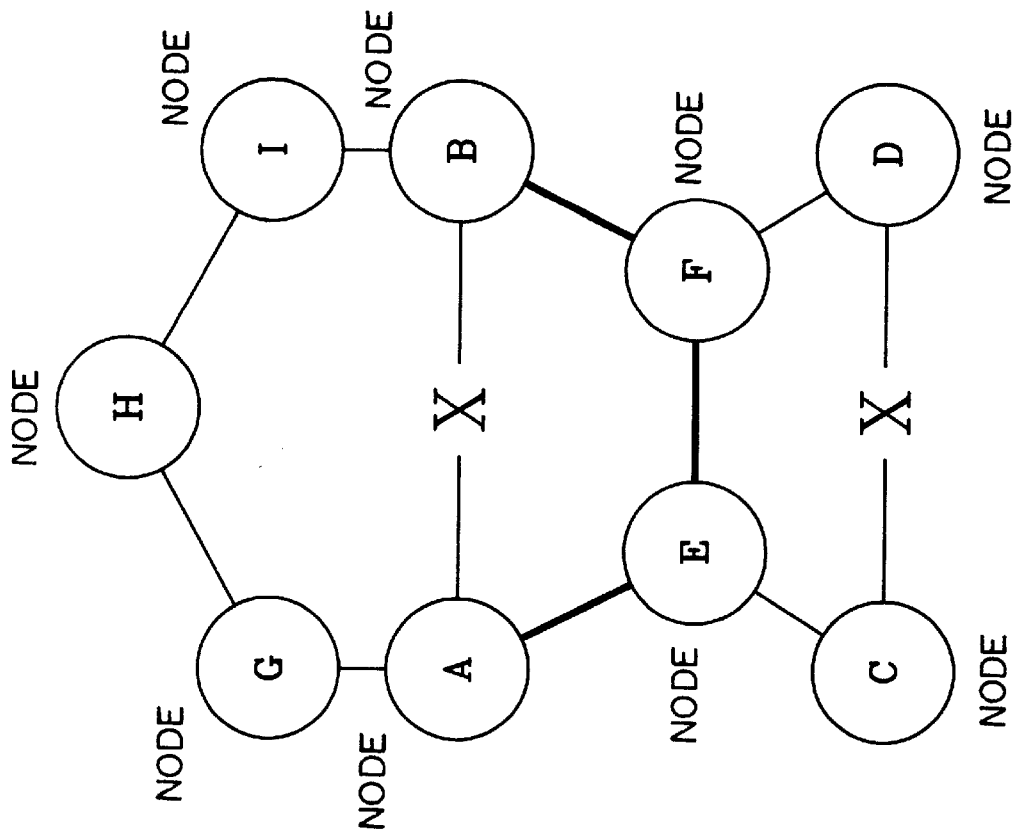
Figure 2D:
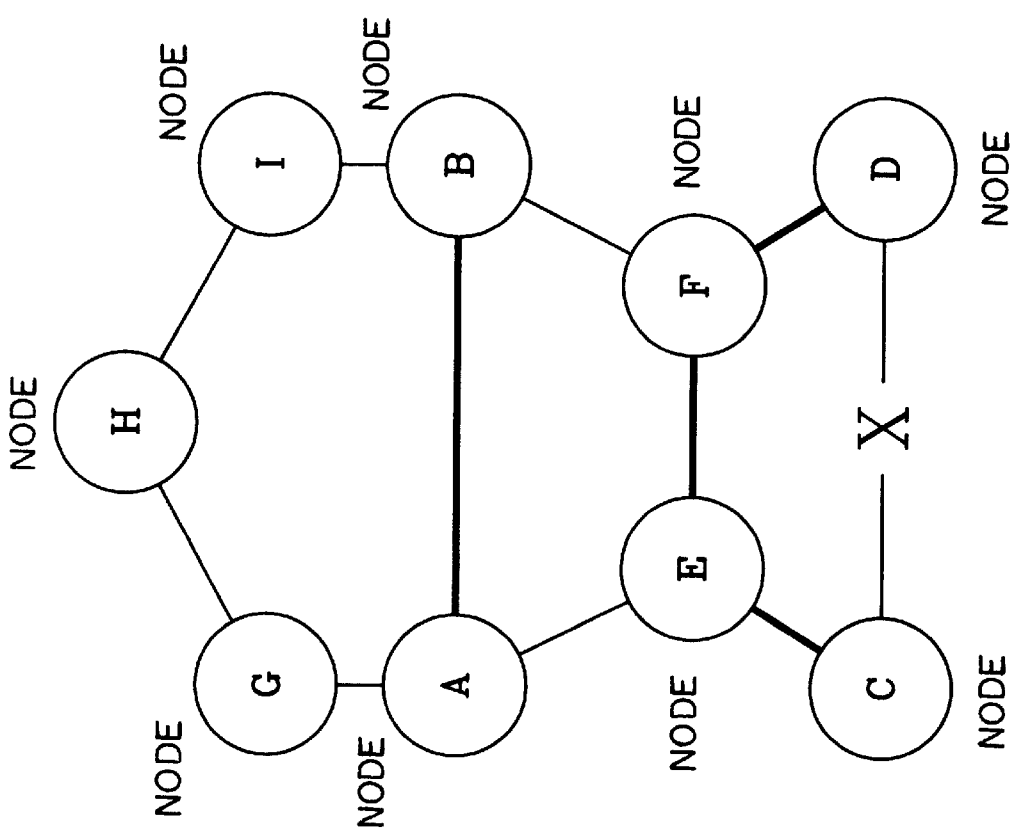

FIG. 2D shows the network of FIG. 2A after suffering a failure of the link between nodes C and D. FIG. 2D also shows one of several possible restoration paths applicable to the failure of the link between nodes C and D.

FIG. 2E depicts the network from FIG. 2A as having undergone a composite failure of both the link joining A and B and the link joining C and D. FIG. 2E also indicates the preferred restoration path for the failed A-B link. Note that the implementation of this path to restore link A-B blocks any implementation that would restore link C-D.

Figure 2F:
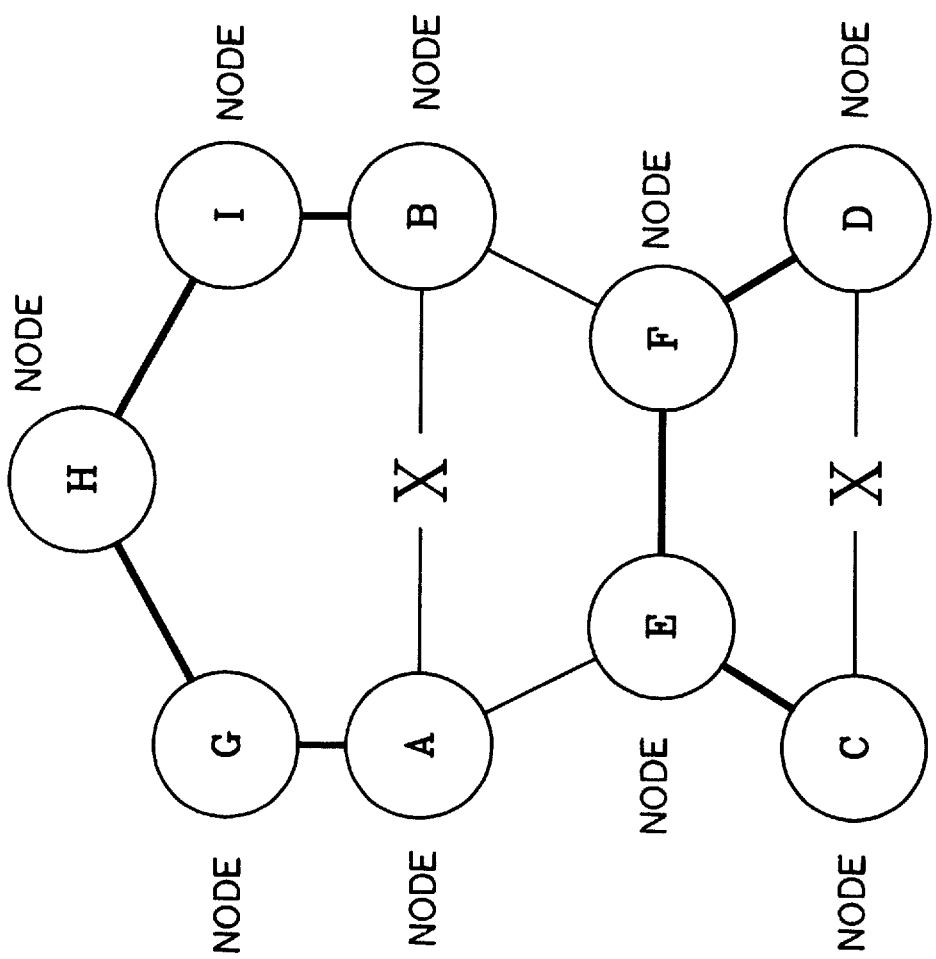

FIG. 2F similarly depicts the failure of both link A-B and link C-D, but differs from FIG. 2E in that it shows a selection of restoration paths that would accomplish restoration of both failed links. For reasons explained in the background information, this latter selection of restoration paths given multiple failures is the preferred outcome as it accomplishes complete, rather than partial, restoration of vital network traffic. To ensure that, at the time of failure, restoration proceeds as in FIG. 2F rather than as in FIG. 2E requires that the restoration algorithm must act upon the more constrained restoration situation first or must otherwise comprehend such constraints on a large enough scale to optimize the degree of overall network restoration.

Figure 3:
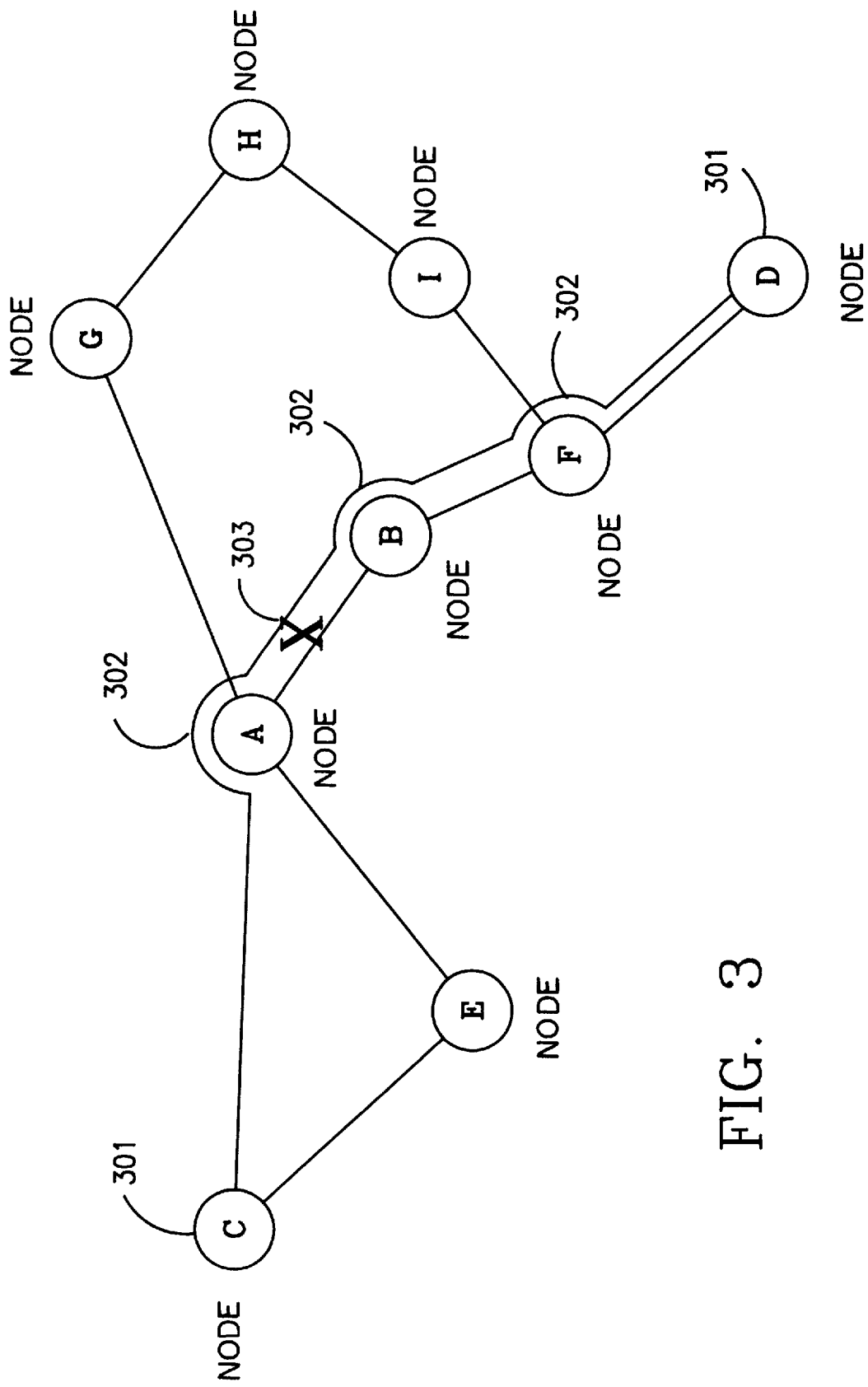
FIG. 3 illustrates a network configuration commonly encountered in practice in which a single physical span cut can cause failure of multiple, logically-diverse links.

FIG. 3 depicts a network that is logically equivalent to the one shown in FIG. 2, but is rearranged to show that, in real network implementations, logically diverse links often share the same physical span. In FIG. 3, nodes 301 are directly joined by a single link. In the case of links that exist as, for example, fiber optic or electrical cable, it is practical and economical to physically route the link along with other links following a similar path. In FIG. 3, the link joining node C and node D makes use of other links such as A-B and B-F by sharing the same physical conduit. At nodes A, B, and F, the link simply enters and exits the physical node site without being processed by any switching equipment. This technique is a passthrough 302 and, in the case of fiber optic cables, is also referred to as a "glass-through". When a single physical span suffers a cut 303, two logically distant links fail at almost the same time, each initiating restorative actions with a separate pair of custodial nodes.

Figure 4A:
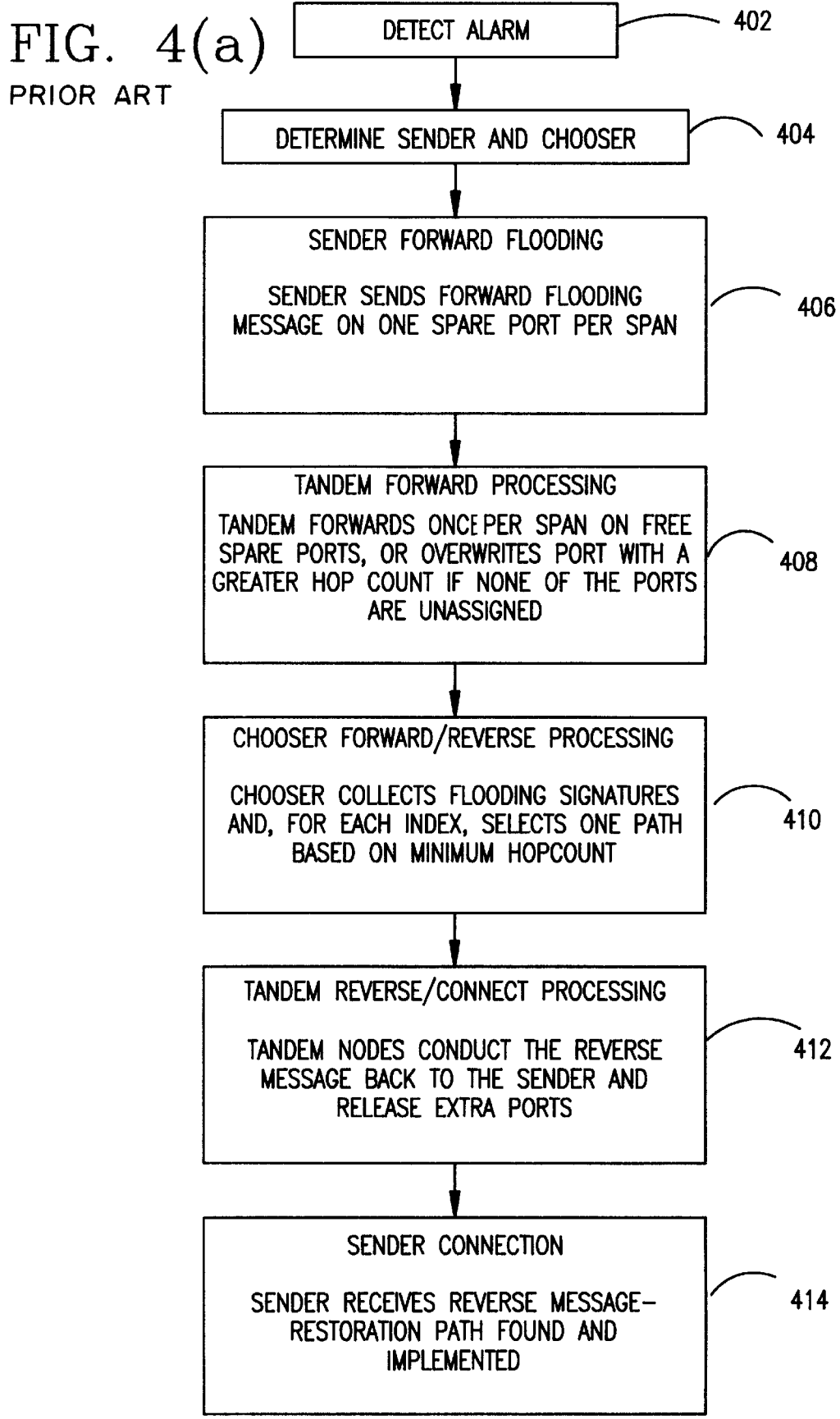

FIG. 4A is a flow chart summarizing the sequence of restorative actions that take place according to the SHN technique taught by Grover in U.S. Pat. No. 4,956,835, which is hereby incorporated by reference and may be reviewed for a more detailed description of the basic protocol.

Figure 4B:
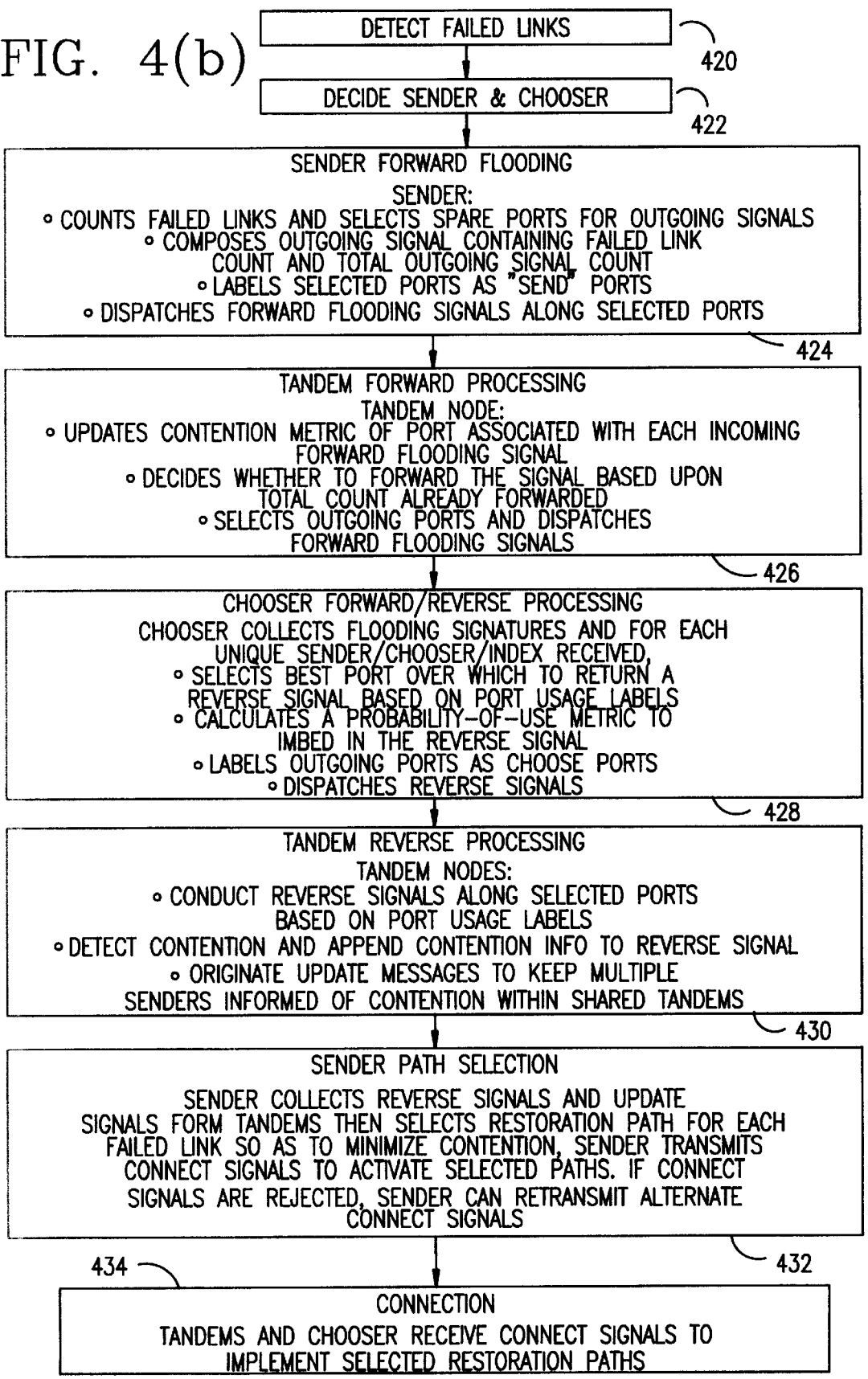
FIG. 4b is a flow chart that summarizes the restoration technique of the instant invention.

FIG. 4B is a flow chart summarizing the sequence of actions and nodal logical activity in accordance with the present invention. FIGS. 4A and 4B may be compared to highlight the differences of the present invention over the prior art.

With reference now to FIG. 4A, the operation of the prior art may be summarized as follows: The restoration process and protocol begins when the network recognizes an alarm condition at step 402. The methods for detecting failure and generating alarms indicating failure of one or more links are commonly known to those skilled in the art and are presumed as a basis for the present invention.

In step 404, the custodial nodes adjacent any failed links adopt the roles of Sender and Chooser using a mediation technique based on, for example, comparison of node ID's. The Sender node then originates special restoration signals along one spare port per span as listed in step 406.

Figures 5A, 5B:
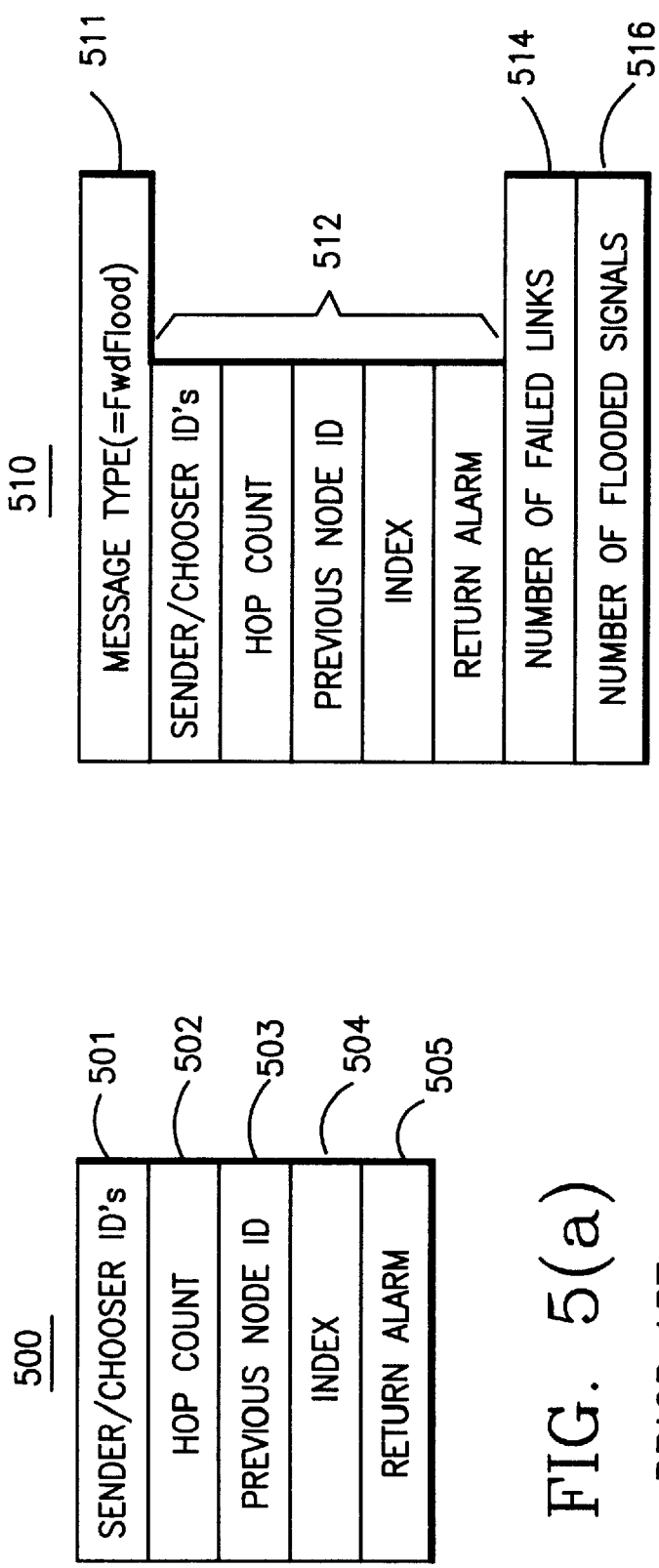
FIG. 5a shows a prior art forward flooding restoration signal.
FIG. 5b shows a forward flooding restoration signal of the instant invention.

Step 408 briefly states the actions of Tandem nodes that receive the restoration signals from a Sender in accordance with the cited Grover patent. Among spans other than the one through which the restoration signal entered the node, the logic searches for a spare link within each span that is not already designated for use. Note that a Sender may try to simultaneously restore several failed links within a single span. In accordance with the SHN protocol, such a Sender can seek multiple restoration paths by imbedding a unique identifier within the restoration signals to correspond to each failed link. This identifier, called the index, is depicted in FIG. 5A as a component 504 of the restoration signal 500.

Referring again to FIG. 4A, step 410 outlines the Chooser node action in accordance with the cited prior art. Basically, the Chooser observes a number of restoration signals arriving along various spare links and makes a decision upon viable restoration path(s) with preference given to shortest paths. In step 412, the selections made by the Chooser are communicated and implemented within the network by the propagation of specially structured signals called reverse signatures or reverse messages. These reverse signals are conducted by the intervening Tandem nodes to eventually reach the Sender in step 414, at which point a restoration path has been established and the Sender may divert traffic from the failed link onto the newly established restoration path to reach the Chooser.

With reference now to FIG. 4B, steps are shown in analogous fashion to FIG. 4A depicting the stages of activity within a network to accomplish restoration of failed links in accordance with the present invention. A main difference emphasized by comparing the figures is that the present invention involves three stages of signalling between Sender and Chooser whereas the cited prior art teaches two stages— forward flooding to find paths and reverse signalling to implement chosen paths. The restoration process of the present invention involves the three stages of conservative forward flooding to find paths from Sender to Chooser, reverse signalling to detect contention among prospective restoration paths for common spare links, and Sender-originated connect signals to finally implement the selected paths. In the latter stage, the Sender actually performs the final selection of restoration paths—a task normally performed by the Chooser as taught in the prior art. Nevertheless, the terms Sender and Chooser are preserved in the nomenclature of the present invention as being a readily identified point of reference by those skilled in the art.

Steps 420 and 422 of FIG. 4B show the functions of failure detection and role arbitration and are equivalent to steps 402 and 404 of the prior art flow chart described earlier in FIG. 4A. Significant differences from the prior art are first evident in the "Sender Forward" step 424 of the current invention wherein the Sender node performs significant processing prior to dispatching forward flooding signals. Specifically, the Sender assesses the total number of failed links and also looks within each span to identify and count the spare links over which forward flooding signals will be originated. These data representing the number of failed links and the number of Sender-originated signals are collected prior to dispatching any forward flooding signals because, in the present invention, these counts are imbedded in each of the outgoing messages. Another activity within step 424 is that of "labeling" the ports that are selected for carrying outgoing forward signals. In the "Sender Forward" processing, the selected ports are labeled within the node as "Send" ports for the duration of the restoration process. Later steps in the process take this label into account as part of the contention avoidance scheme of the present invention.

After forward signals are dispatched from the Sender in step 424, other nodes may receive the forward signals and adopt the role of intervening Tandem nodes in a manner similar to the SHN protocol described above. The "Tandem Forward" step 426 depicts the actions of Tandem nodes in processing forward restoration signals in accordance with the present invention. As with the Sender node logic, substantial enhancements to the cited prior art are evident in this step, namely the maintenance of a contention metric for each port and the option to curtail excessive forward flooding or so-called "greediness" for spare links. Both of these functions are based upon the number failed and number flooded data fields contained in the incoming signals.

As in the SHN approach, forward signals from the Sender traverse the network and eventually reach the Chooser to then be handled as in "Chooser Forward/Reverse Processing" step 428. The Chooser first accumulates forward signals in a table to aid in decision making. Then the Chooser uses the accumulated data to return a single reverse message for each unique index emitted by the Sender. In the course of processing according to the present invention, the Chooser also derives a probability-of-use metric to insert into the reverse signals, selects best ports through which to conduct reverse signals, and labels the selected outgoing ports as "Choose" ports. This labelling is similar to the Send port labeling performed in step 424 above.

The "Tandem Reverse" step 430 is entered as reverse signals from the Chooser propagate back to the Sender through interposed Tandem nodes, if any. Within the Tandem node processing, selection of outgoing ports is performed—a common theme in the node logic taught by the present invention. Tandem nodes accumulate adequate information for the duration of the restorative process to be able to detect when several possible restorative processes are vying for the same spare links. When this kind of potential conflict among uncommitted paths is detected, a Tandem operating under the present inventive concept can perform two actions. The Tandem can append contention details to reverse signals before passing them along and can originate so-called "update messages" to Senders in separate restoration processes to notify them of new contention status within the Tandem. This inter-process communication among separate restoration processes as taught by the present invention solves many problems of the cited prior art—particularly in dealing with coincident failures of multiple logical spans.

Reverse signals originated by the Chooser and conducted by Tandems are collected by the Sender in step 432. Update signals are also collected and recorded in a similar manner. Then, the Sender reviews the list of reverse signals received and, based upon the contention information therein, makes appropriately informed choices of restoration paths. Finally, the Sender initiates the third stage of the restoration process by generating connect signals to implement the chosen paths within the network. Step 434 refers to the receipt of these connect signals by the Tandems and Chooser to secure the selected paths.

Referring now to FIG. 5, the composition of several restoration signals are shown. Specifically, FIG. 5A shows the essential components of a forward flooding restoration signal as instructed by the cited prior art and is provided here for comparison. FIG. 5B describes the forward flooding restoration signal with additional components in accordance with the present invention.

In FIG. 5A, the roles of the components of the prior art signal 500 are summarized as follows: Sender/Chooser element 501 identifies the custodial node pair—the source and intended recipient of the forward-travelling restoration signal. The Index element 504 is an arbitrary number assigned by the Sender node to distinguish each outgoing signature. A Sender may suffer numerous failed links along a single span and may thus require multiple restoration paths. The use of Index element 504 allows a Chooser to identify several distinct restoration paths from among the received signals. Hop count element 502 is used to maintain a cumulative count of how many links the forward signal has traversed since leaving the Sender node. The prior art teaches that this hop count is useful for selecting shorter restoration paths in preference to longer ones. In practice, the hop count is initialized by the Sender node to some hop limit value and decremented by each Tandem that handles the message. Tandem nodes block the propagation of signals wherein the hop count has reached zero. This practice serves to limit the scope of the restoration flooding to reasonably local levels within a large network and attenuates some anomalous propagation phenomena. The Previous Node ID 503 provides traceability back to the Sender as instructed by the cited prior art. The Return Alarm 505 is used in the reverse signal in handling unidirectional failures as taught by the cited prior art.

Referring now to FIG. 5B, the restoration signal 510 of the present invention is shown to comprise the group of elements 512 that exist in the prior art plus additional elements 511, 514 and 516. Message Type element 511 simply differentiates the roles and formats of the variety of messages used in the present approach. In accordance with a preferred embodiment of the present invention, the #FAILED field 514 and #FLOODED field 516 are integer data fields that are set by the Sender. These added elements in the signal indicate the likelihood that a prospective path traversed by the signal will actually be needed for restoration purposes. In one preferred embodiment of the present invention, the probability of use is calculated from these two parameters by multiplying the #FAILED field 514 by 100 and then dividing by the #FLOODED field 516. This ratio yields of probability of use figure expressed as a percentage. For example, assume that a Sender detects three failed links and, among all of its spans, is able to locate exactly three spares through which to originate forward flooding signals. The Sender will emit three signals with unique indices and each signal will bear the #FAILED value equal to three and the #FLOODED value equal to three. Thus, any other node may use the calculation described above to derive a probability of use value of 100 for a path carrying one of the forward signals. This signifies that, with three failed links and only three flooding signals emitted, the probability is 100% that any of the found paths will be required by the Sender for restoration. Likewise, if the Sender had three link failures and was able to find six spare links over which to launch forward signals, the collective data fields 514 and 516 within each forward signal would represent a 50% probability of use for each found path.

In carrying out the present invention, the #FAILED and #FLOODED fields are also used separately in other calculations and are therefore imbedded as two separate fields in the signal rather than as a single field.

Figures 5C, 5D:
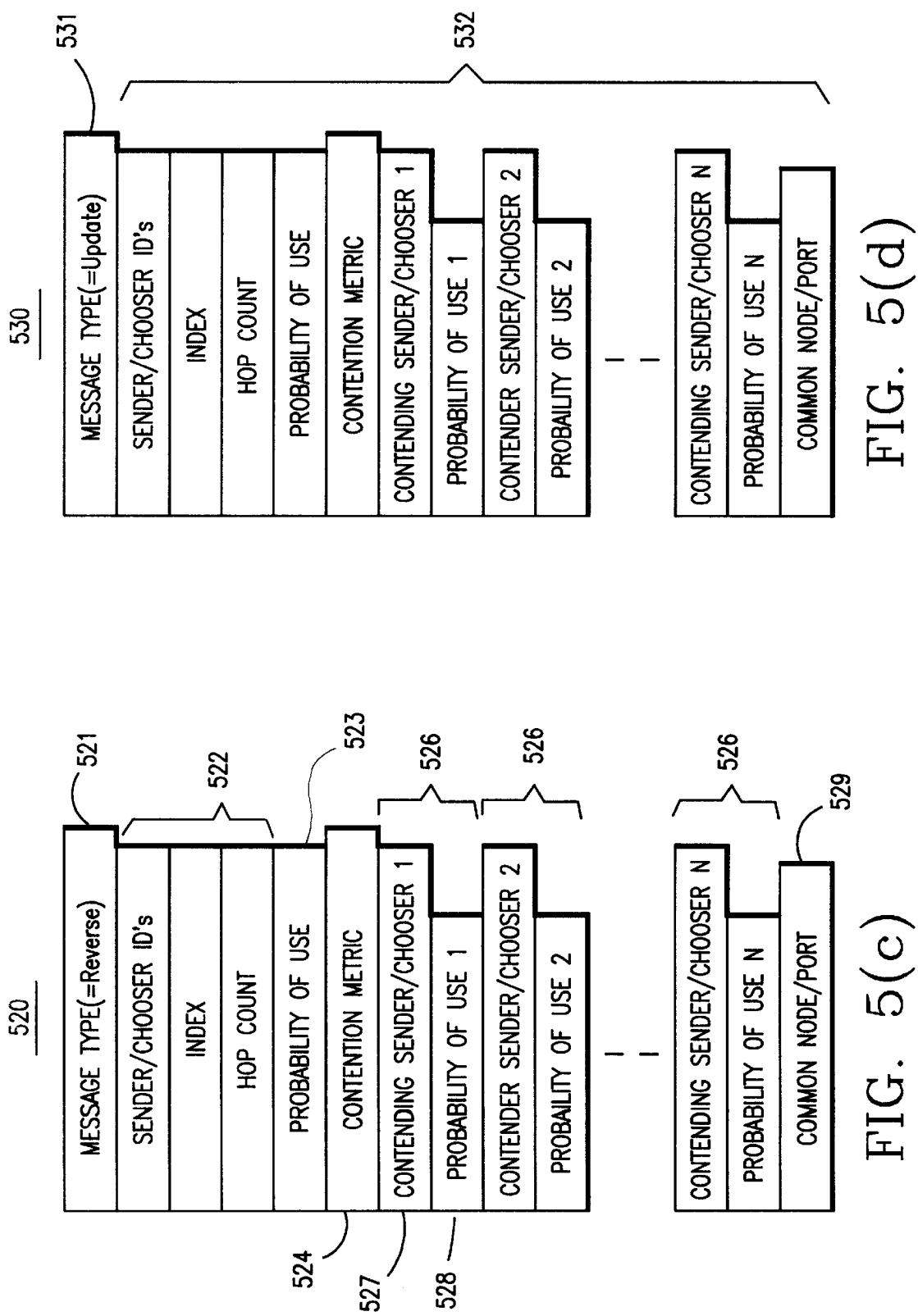
FIG. 5c shows a reverse signal of the instant invention.
FIG. 5d shows an update signal of the instant invention.

The content of a reverse signal in accordance with the present invention is shown in FIG. 5C. Like the forward signal, the reverse signal 520 contains a Message Type field 521, a subset of elements 522 common to the SHN protocol, plus some useful additional elements pursuant to the present invention. Specifically, a probability of use 523 is calculated by the Chooser and included in each reverse signals to characterize the criticality of the restoration path. The logic applied to the field 523 is described in greater detail later. The contention metric 524 contains an integer representing the number of span cuts competing for a common spare resource. Another type of element that may be appended to the reverse signal is the contention descriptor pair 526. Several of these elements may be present—the number of which should correspond to the value of the contention metric 524. Each contention descriptor 526 comprises a Sender/Chooser pair 527 and a probability-of-use metric 528 useful for minimizing contention among separate restoration processes. For example, assume that two failures have occurred in a network and that two separate restoration processes are independently initiated. During the forward flooding stage, each Tandem node keeps a list of forward flooding signals passed through each port. During the reverse signalling stage as taught by the present invention, a Tandem can use the port-associated data to detect that differing Sender/Chooser pairs are relying upon a given port for restoration. When a reverse message for one Sender-Chooser pair passes through a Tandem where such conflict is detected, the reverse signal is appended with one or more contention descriptors 526. The identity of a foreign Sender/Chooser pair and the probability that the other pair will require the contended spare link are encoded in each contention descriptor 526. This serves to alert the Sender to the identity and potential significance of competing restoration processes.

Figure 13:
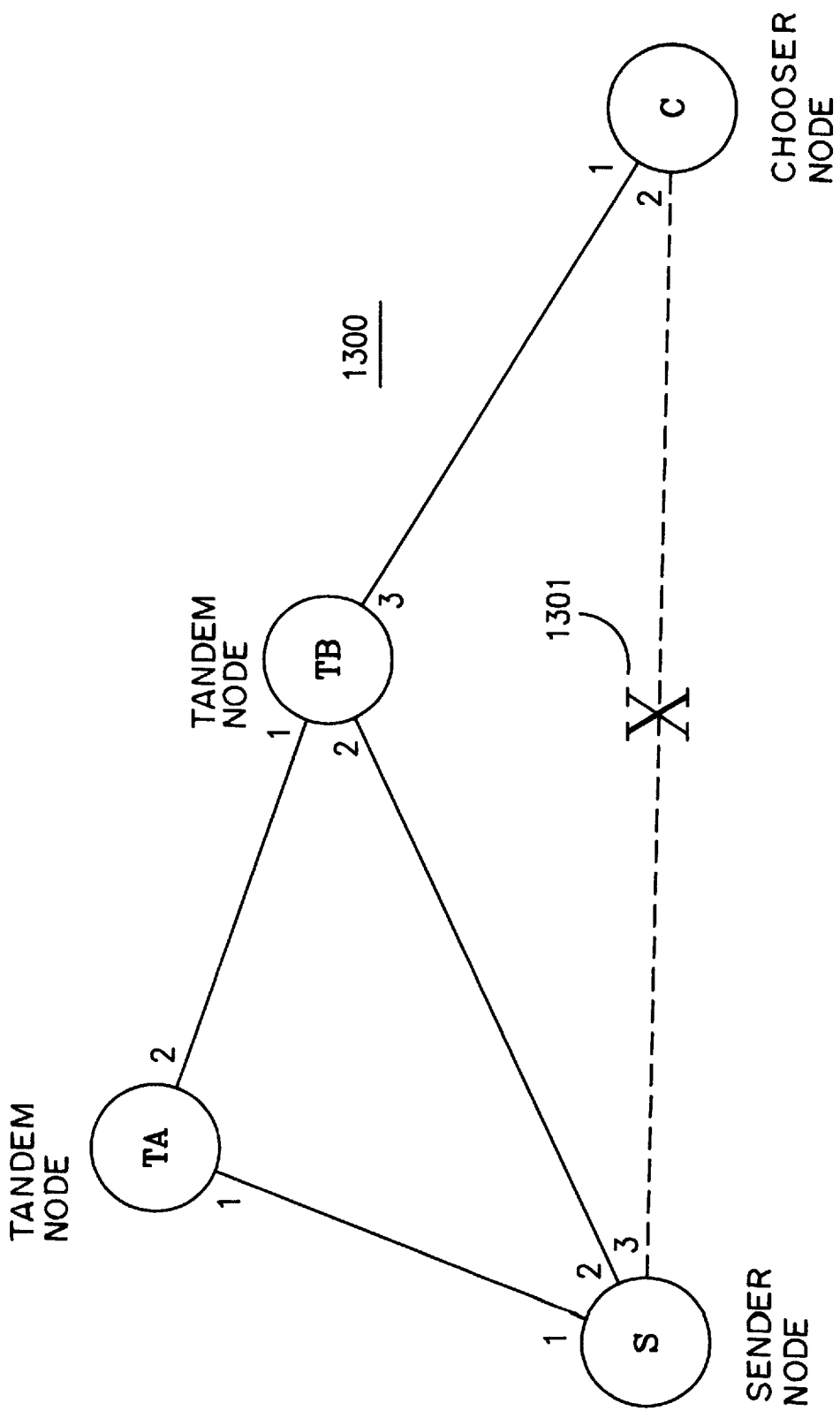
FIGS. 13 and 14 typify common network topologies for which the present invention provides unique and useful logic features.

The reverse signal may optionally be further appended with a Common Node/Port descriptor 529. This field designates a node ID and port at which several signals from the same process converge during forward flooding. The role of this field is best understood by referring briefly to FIG. 13 of the drawings in conjunction with the following explanation. FIG. 13 shows a simple network 1300 that is representative of a topological situation common in more complex networks. All spans in this example each consist of only a single link. Network 1300 is shown to have undergone a span cut failure 1301. The nodes depicted in network 1300 are labeled according to their roles in the restoration process that is started in response to the span cut. The Sender node S will dispatch two forward flooding signals—one along port S1 and the other along port S2. In accordance with the present invention, these signals will each bear a #FAILED value indicating that only one link needs to be restored.

Tandem node TB will receive a forward signal along port 2, make note of the signal as described earlier, and will propagate the signal then along port 3 (and, incidentally, along port 1). At roughly the same time, the forward signal dispatched from port S1 will arrive at tandem port TA-1 and be forwarded to its adjacent Tandem port TB-2.

Then, upon receipt of this second signal, Tandem TB recognizes that a) this is yet another forward signal representing the failed link caused by span cut 1301, b) the number of failed links in the failed span is one and c) that one forward signal has already been propagated related to the span cut. The logic of Tandem TB, operating according to the present invention, concludes that there is no purpose served in propagating further forward signals in this case, or more generally, propagating a quantity of signals along a span that is greater than the quantity of failed links. Instead of propagating the second forward signature, the Tandem TB stores the second forward signal in a holding buffer for use later during the reverse signalling stage of the restoration process according to the present invention.

Now referring back to FIGS. 5C and 5D and regarding the reverse signal 520, update signal 530 serves a related purpose during reverse signalling. Because all reverse signals do not proceed through the network simultaneously, it is possible that a conflict could be detected after a given reverse message has already passed beyond a Tandem where the conflict exists. In the protocol of the present invention, update signal 530 can be originated by a Tandem as needed to keep multiple Senders abreast of changes in contention metrics.

Figure 14:
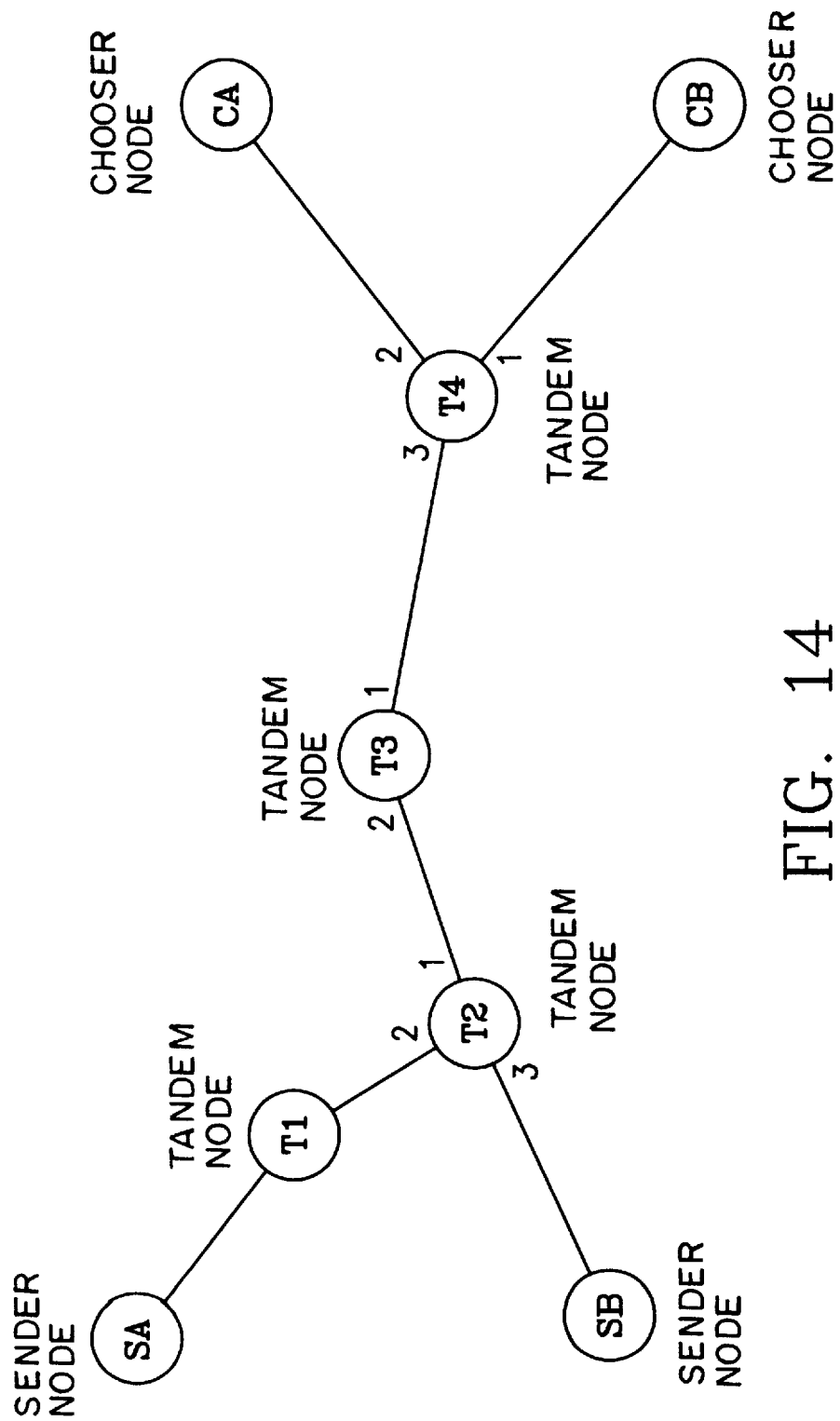

The role of update signal 530 can be better explained in conjunction with FIG. 14 of the drawings. FIG. 14 shows a simple network to illustrate how two restoration processes might encounter common restoration paths. Note that non-essential network portions, including the failed links and other network features are eliminated in this diagram for clarity. Referring now to the network of FIG. 14, a Sender and Chooser for one restorative process, designated SA and CA, have a viable path through Tandem nodes T1–T4. A separate restoration process is active at the same time as signified by a second set of Sender and Chooser nodes, namely SB and CB. Custodial pair SB and CB have a path through Tandem nodes T2–T4. In accordance with reverse signalling stage of the present invention, Chooser CA will send a reverse signal to port T4-2. Tandem T4 will identify port T4-3 as the appropriate return port and will accordingly send the reverse signal through this port and label the port as being used by the SA-CA restoration attempt. Similar actions occur within Tandems T3, T2, and T1 in propagating the same reverse signal to Sender SA. So far, no contention has been detected in any of the Tandems.

Assume then that Chooser CB begins sending reverse signals intended for Sender SB. At Tandem T4, the operating logic will identify port 3 as the correct port along which to dispatch the reverse signal but will detect contention because the only port available has already been labeled for tentative use by the SA-CA process. The logic of Tandem T4, according to the present invention, will then append contention information to the reverse signal to communicate to Sender SB the identity of the competing process and, in a preferred embodiment, the likelihood that the other process will require the contested port. The reverse signal is further conducted through Tandems T3 and T2 wherein similar logic is applied. A problem arises at this point in that the contention for common resources has been communicated to Sender SB but Sender SA is unaware of the contention. Thus, in accordance with the present invention, a supplementary update signal 530 is originated by tandem T2 in this example and sent to Sender SA at the same time the reverse signal is sent to Sender SB. The logic of Tandem T2 knows to originate said update signal by recognizing contention information in the passing reverse signal and also recognizing that the paths to the Senders of the contending processes diverge along ports T2-2 and T2-3.

Update signal 530 is identified as such by a specific value of Message Type field 531 and further comprises elements 532 that are equivalent to those in the Reverse Signal 520.

Figures 5E, 5F:
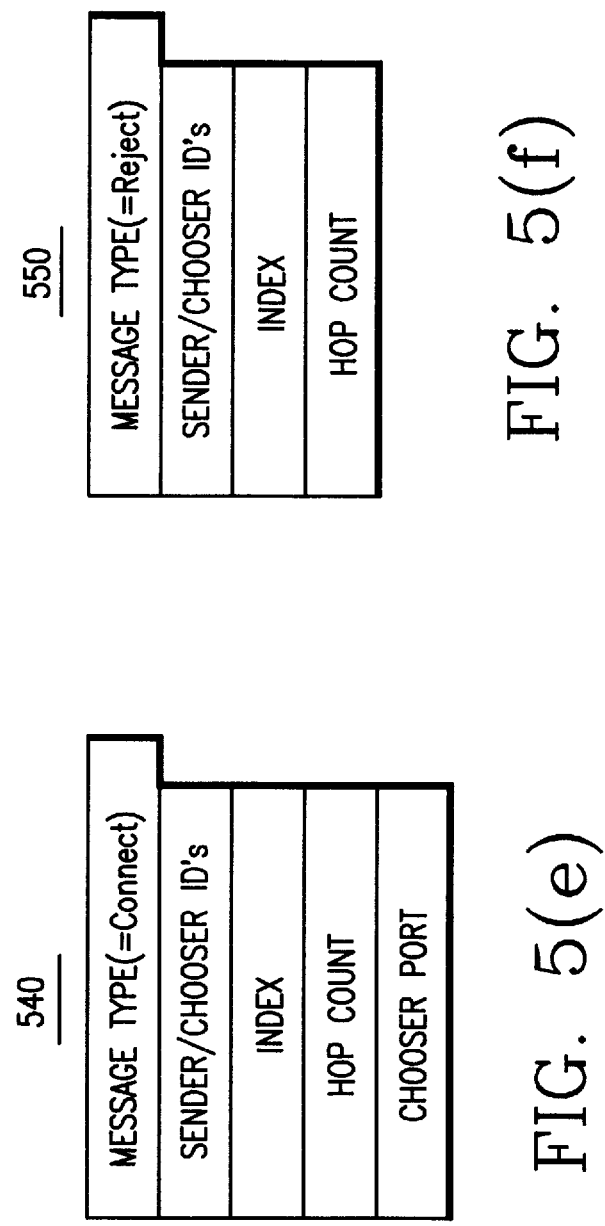
FIG. 5e shows a connect signal of the instant invention.
FIG. 5f shows a reject signal of the instant invention.

In the present invention, a connect signal 540 composed as in FIG. 5E is generated by a Sender during the final connection phase of the restoration. The connect signal operates in analogous fashion to the reverse signal taught in the cited prior art in that it propagates along tandem nodes, finalizing the restoration paths as it traverses the network.

A final type of signal pertaining to the present invention is the reject signal 550 of FIG. 5F. This signal is used whenever a Sender attempts to implement a restoration path that, due to further network failure or unresolvable contention, is no longer available. When a Tandem receives a connect signal that it can not comply with, the Tandem sends a reject message back to the Sender. The Sender may then seek to establish an alternate restoration path by sending out other connect messages.

Figure 6:
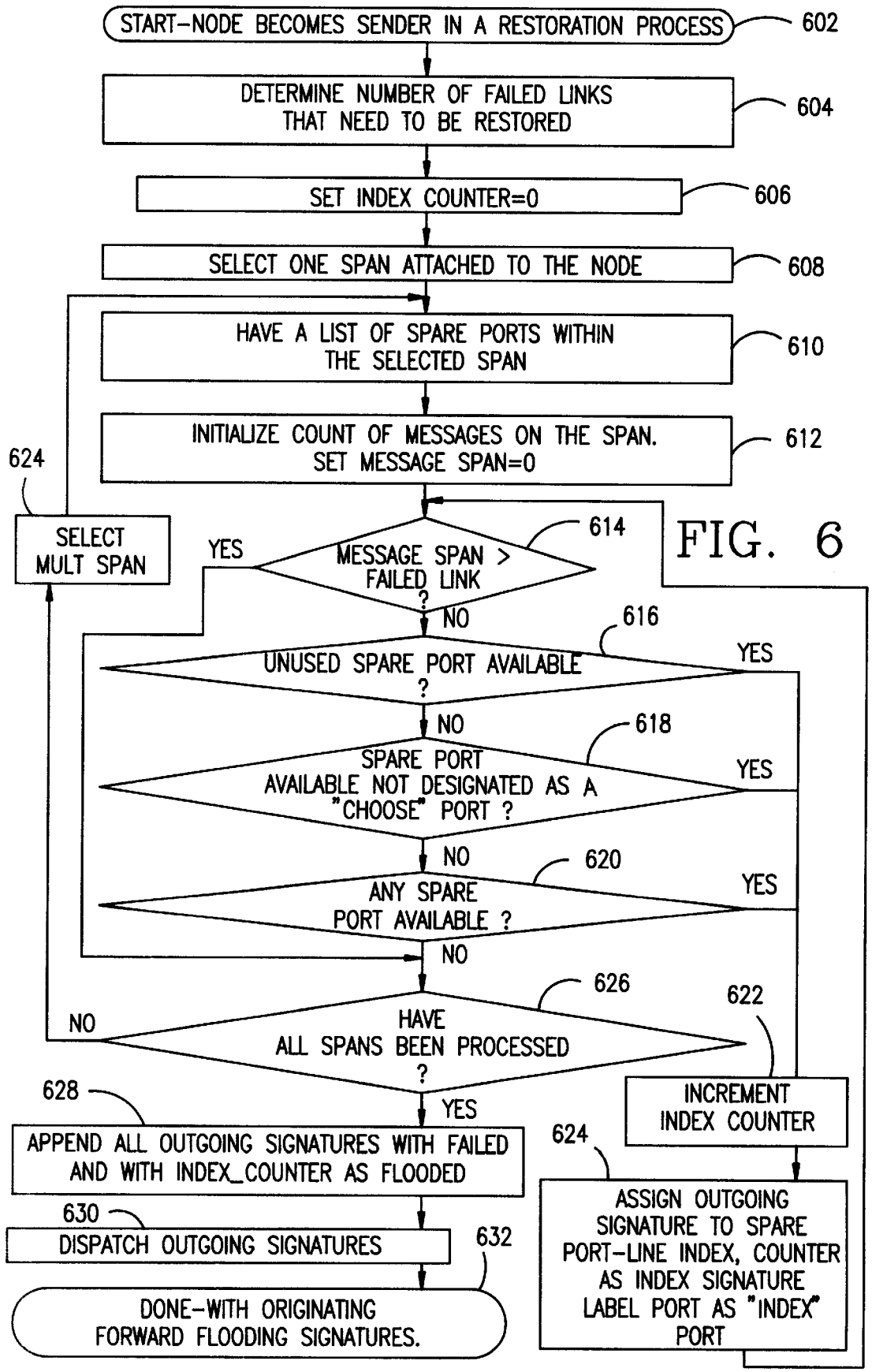
FIGS. 6 through 8 are flow charts describing the logic exercised by Sender, Tandem, and Chooser nodes during the forward flooding phase of a restoration process in accordance with the present invention.

Referring now to FIG. 6, the flow chart describes the logical steps by which the Sender originates forward flooding messages at the onset of the restoration process as taught by the present invention. This flow chart expands upon the function summarized in block 422 of FIG. 4B.

Step 602 signifies the beginning of a process carried out in a network node in fulfilling the role of a Sender in like manner to the SHN protocol. The total number of failed links is first counted by the Sender in Step 604. In step 606, an integer counter is initialized to zero and will be used to keep a tally of the total number of flooding messages sent from the Sender node in response to the outage. In step 608, one of the spans attached to the node is selected as the focus for following steps that apply on a per-span basis.

For the span identified in step 608, step 610 involves making a list of spare ports within the span. Step 612 initializes a counter for monitoring the total number of messages assigned to a span. Together with step 612, step 614 limits the number of outgoing signals along any one span to the number of failed links known to the Sender. In this way, only the required number of restoration paths are sought along each span. The more indiscriminate flooding approach of the prior art tends to consume all spares for only a few failures. In multiple failure scenarios, the prior art also allows a race condition to hinder total network restoration.

Steps 616, 618 and 620 apply preference in selecting a outgoing port for each forward signal to be sent. A port that is as yet unused and unlabeled is preferred above all others. Step 616 handles this case. Step 618 allows for selection of an uncommitted port even if it has been labeled as a "Chose" port in the course of other processing. Finally, step 620 permits the use of any spare port that has not been switched into active duty, even if the port has been labeled for tentative use.

If a spare port can be found that complies with any of these stipulations, then step 622 increments the index_counter and an outgoing signal is tentatively assigned to the port in step 624—the signal is not actually sent along the port until step 630 when all outgoing signals have been decided. Also in step 624, the selected port is labeled as a "Send" port to record its tentative use as part of a restoration path. Other processes may read this label and take it into account in making port selections to avoid contention.

Step 626 forms a loop along with step 634 to repeat the per-span processing for all spans connected to the node. When step 626 detects that all spans have been processed, execution proceeds with step 628 wherein the #FAILED and #FLOODED fields are added to all the outgoing signals. Note that the value of #FLOODED is taken from the index_counter that was incremented for each outgoing signal in step 622.

Finally, outgoing signatures are dispatched in step 630 and then the Sender node's initial forward processing terminates at step 632.

Figure 7:
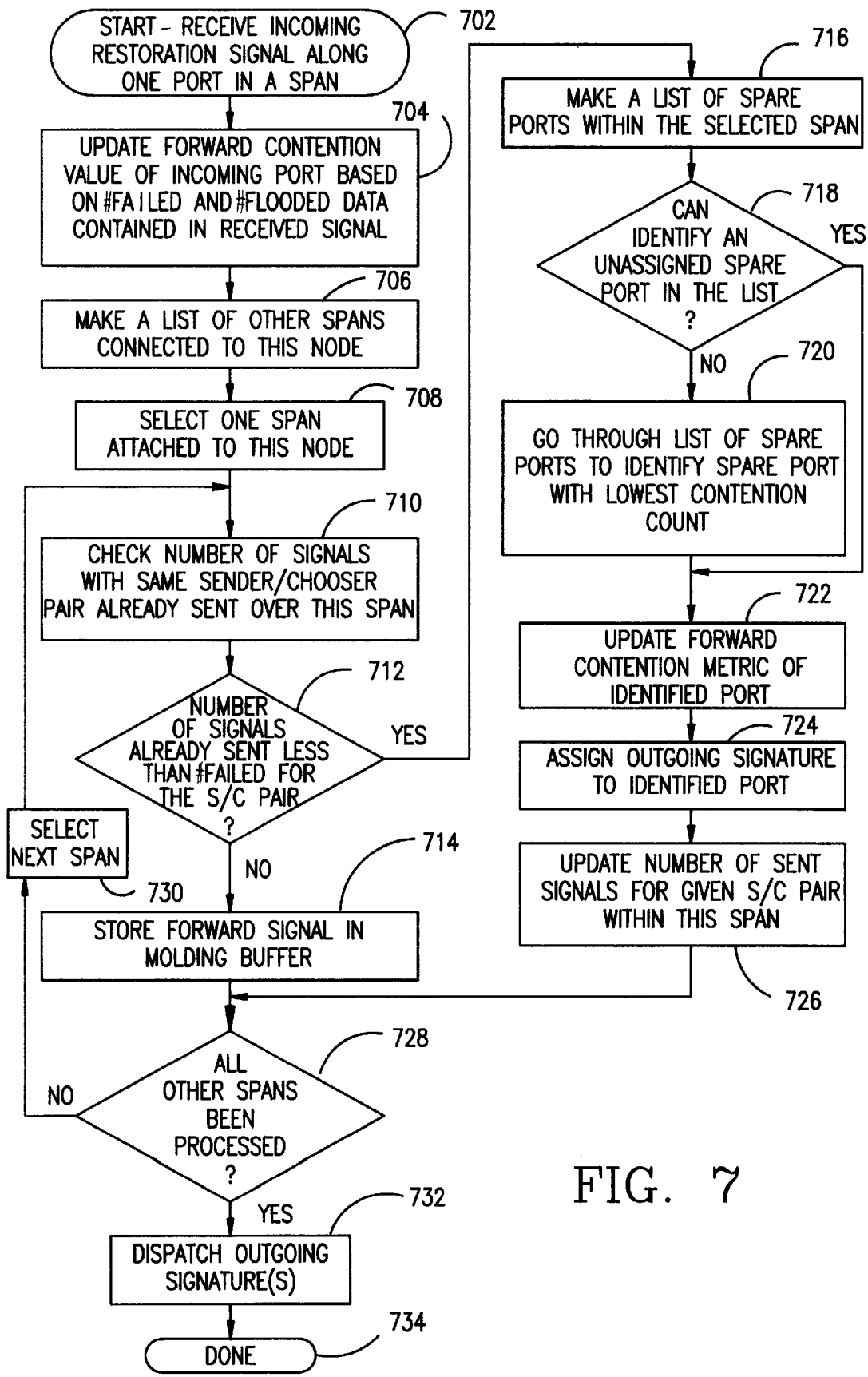

The next network event that happens after the Sender originates flooding signals is that other nodes receive the flooding signals and function as Tandems in the restoration process. The logic applied within such a Tandem node in accordance with the present invention is depicted by the flow chart of FIG. 7. Referring to step 702, an iteration of tandem node processing begins as a forward restoration signal is recognized entering the node along a spare link. The recognition of the incoming restoration signal is accomplished by any of several possible means that are either well known to those skilled in the art or are adequately described in the cited prior art. As each forward signal enters a tandem node through a port, a forward contention metric associated with the port is updated and stored within the tandem. In one preferred embodiment of the present invention, this forward contention value is updated as follows: A probability of use metric is derived from the incoming signal by multiplying the #FAILED by 100 and then dividing by #FLOODED. See these elements in FIG. 5B. This provides an integer value indicating the probability that the Sender will require the path represented by the forward signal—a value of 100 represents certainty. This probability of use is simply added algebraically to the cumulative contention metric for the port. Over the duration of the restoration process, the contention metric is simply the sum of probability of use values for all forward flooding signals passing through the port—both incoming and outgoing. Other schemes for accumulating a "busy port" measurement may certainly be implemented without altering the basic intent of the present invention.

Continuing now with step 706, a list is made of all spans connected to the node except the span through which the incoming restoration signal entered the node. This list is used by subsequent steps that pertain on a per-span basis. Step 708 is that of selecting one span from this list to focus upon for each iteration of the steps that follow.

A notable departure from the SHN approach is expressed in steps 710 and 712 wherein a decision is made to limit the number of forward flooding signals for a given Sender-Chooser pair. For each span, the Tandem node maintains a record of how many forward signals have been dispatched along the span. More over, this record tallies the number of signals forwarded for each Sender/Chooser pair. Step 710 uses the Sender/Chooser pair and the #FAILED contained in the incoming signal and compares it to the number of signals already sent by the span for that same Sender/Chooser pair. Step 712 differentiates handling so as to curtail further forwarding if the number of signals dispatched along a span is already equal the number of failed links. This feature, unique to the present invention, seeks to minimize contention by limiting "greedy" behavior during the forward flooding stage.

Step 714 is executed in the event that excess forward flooding signals are reaching the Tandem as determined in step 712. The excess forward signals are not discarded but are instead set aside in a holding buffer to play a possible role during a later stage of the restoration processing.

If step 712 determines that the forward signal will be sent out along the selected span, then steps 716 through 720 set about to select a port within the span upon which to send out the signal. Step 716 involves making a list of spare ports within the span as a context for subsequent processing. Step 718 determines whether there is a port in the list that is available and has not been labeled for tentative use by any restoration processes. If there such a port, then steps 722 through 726 proceed to use the identified port.

Step 720 is performed in the event that all spare ports in the span have already carried some restoration signals. As an important feature of the present invention, step 720 seeks to minimize contention by selecting an outgoing port with the lowest forward contention metric. Once an outgoing port has been selected, step 722 updates the forward contention metric associated with the port using the arithmetic described earlier. Then step 724 assigns the outgoing signal to the identified port. This assignment includes composing an outgoing signal from portions of the incoming signal and asserting certain values within the outgoing signal prior to dispatch. The final step 726 performed for each outgoing signal is the updating of the count of the number of signals sent out along the span for each Sender/Chooser pair. This action sets a value that is used for making the decision of step 710.

Figure 8:
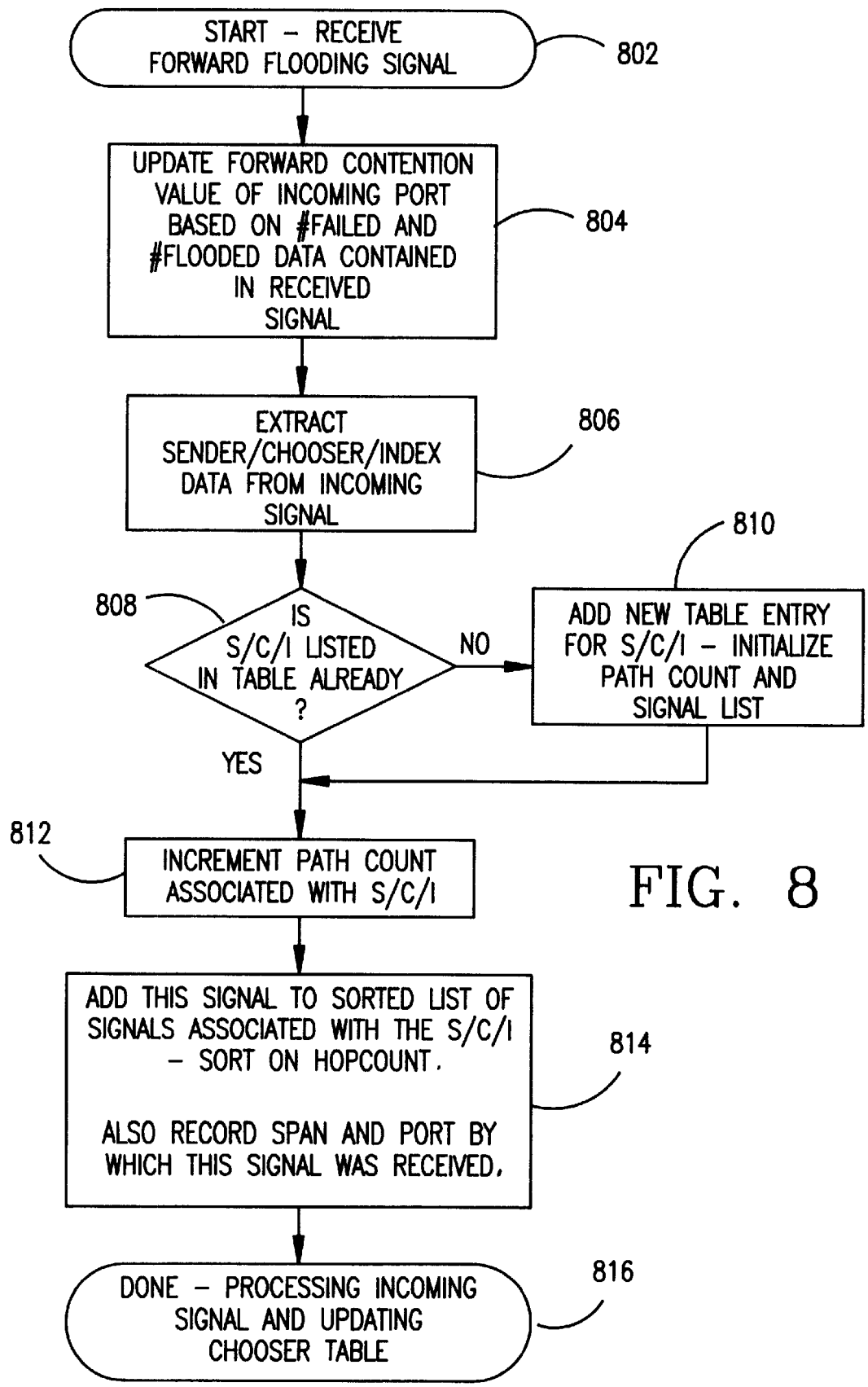

With reference now to FIG. 8 of the drawings, restoration proceeds as the Chooser node receives forward flooding signals that were originated by the Sender. As instructed by the SHN approach, forward signals entering a node are tested to determine if the Chooser ID in the signal is equal to the ID of the node receiving the signal. If so, then the node adopts the role of Chooser in handling the signal. A similar qualification is applied in the present invention, whereupon the logical steps of FIG. 8 are iterated for each forward signal in which the current node is the named Chooser. Steps 802 through 816 accomplish the accumulation of forward signals in a table that is later used by the Chooser for selecting reverse signalling paths. This table records each unique Sender/Chooser/Index combination received and, for each such combination, maintains a list of signals received and a count of the number of signals received. Furthermore, for each signal listed, the span and port through which the signal arrived is also noted. The utilization of the data within the table is described later in discussing the "Chooser Reverse" processing of FIG. 9.

Step 802 begins as a forward signal that identifies the current node as the Chooser is received. Step 804 updates the forward contention data associated with the port in a manner described earlier for step 704 of the "Tandem Forward" processing logic in FIG. 7.

The Sender, Chooser, and Index are extracted from the incoming signal in step 806 and concatenated to form a unique specifier for a candidate restoration path. In step 808, the table is scanned to check if the Sender/Chooser/Index combination (S/C/I) are already listed in the table. Step 810 creates and initializes a new portion of the table as new combinations are experienced. For both new and previously observed S/C/I's, the path count is incremented in step 812 and then selected data regarding the incoming signal are added to the signal list associated with the S/C/I in step 814. Step 816 marks the end of processing pertaining to a single received forward signal.

According to the present invention, the next stage of the restoration process consists of reverse messaging from Chooser to Sender with the primary goal of detecting conflict. This contrasts with the SHN approach wherein the reverse messaging stage finalizes the implementation of chosen paths. The reverse messaging stage begins with step 902 of FIG. 9 when a determination is made that the Chooser has received all expected forward signals or at least an adequate number thereof. This determination may be based on, for example, a fixed time limit or some algorithm involving signal content or arrival interval. How the determination is made that the Chooser is finished receiving forward signals is not a fixed attribute of the present inventive concept.

Figure 9:
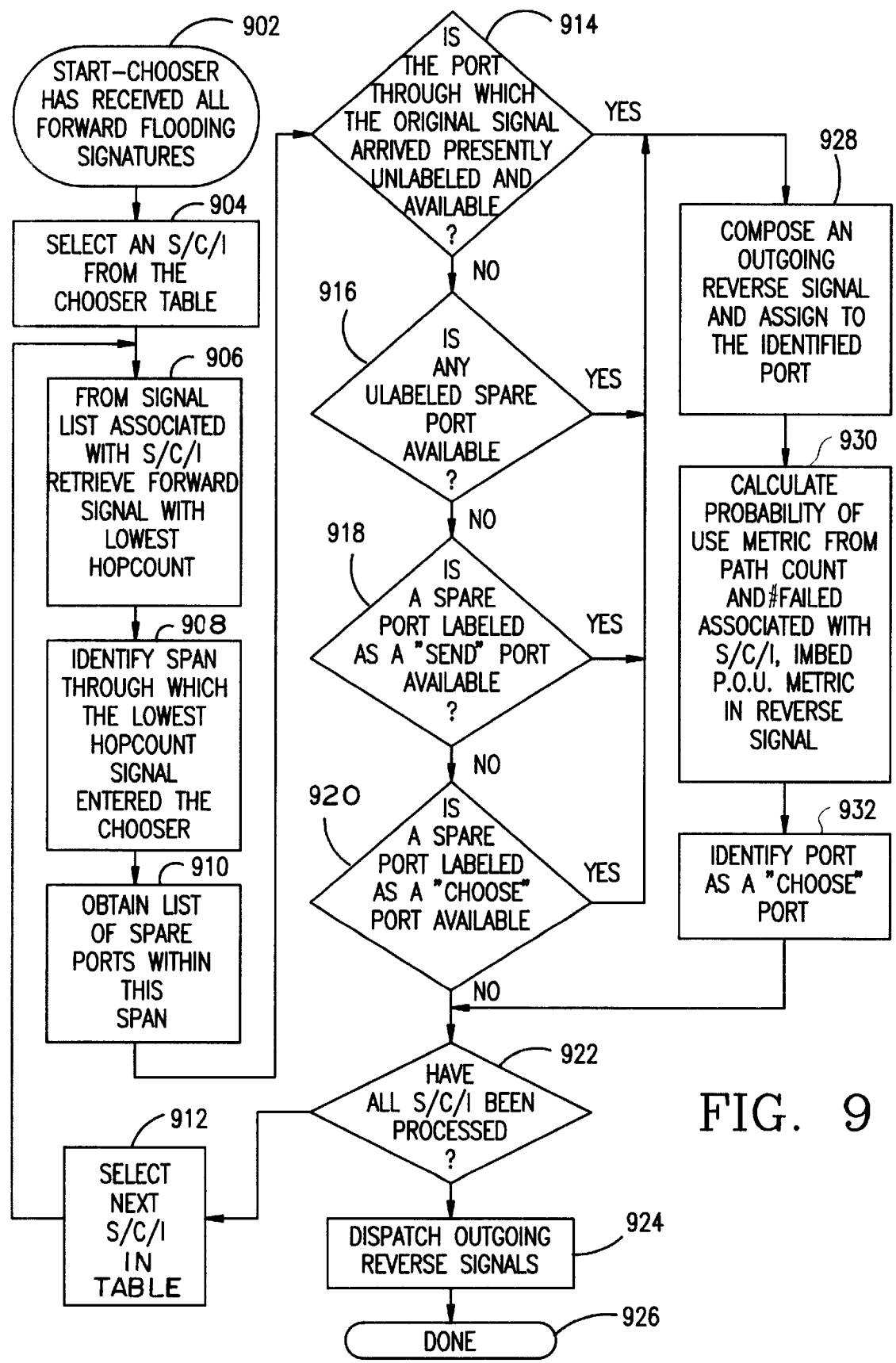
FIGS. 9 through 11 are flow charts describing the logic executed by Chooser, Tandem, and Sender nodes during the reverse signalling phase of a restoration process in accordance with the present invention.

The "Chooser Reverse" processing described in FIG. 9 is performed upon the table of information accumulated during the "Chooser Forward" processing outlined in FIG. 8.

Step 904 selects one of the S/C/I combinations from the chooser table so that subsequent steps apply in the context of the selected S/C/I. Step 906 accesses the table to retrieve the lowest hop count signal that was received for the selected S/C/I during the forward flooding stage. In step 908, the span and port through which the low hop count forward signal was received are recalled so that in steps 910 and 914, the original span and port of receipt are preferred for dispatching a corresponding reverse signal. Step 910 creates a list of spare ports sharing the span through which the earlier forward signal was received. Steps 914 though 920 attempt to select from this list the best port for dispatching a corresponding reverse signal, implementing a preference of original, unused, and labeled ports. Upon finding a port that meets the criteria of steps 914–920, steps 928–932 commit the outgoing signal to the port. Specifically, in step 928 an appropriate outgoing reverse signal is composed. In step 930, a probability of use metric is calculated for the prospective restoration path that is to be represented by the reverse signal. This probability of use is made a part of the outgoing signal as depicted in element 504 in FIG. 5C.

Finally, the port selected for output is labeled as a "Choose" port in step 932. Looping through all S/C/I's in the table is accomplished by blocks 922 and 912, which return processing to step 906 until placement of a reverse signal has been attempted for all S/C/I's in the table. The reverse signals generated by the "Chooser Reverse" processing of FIG. 9 are finally dispatched in step 924 and the processing is concluded in step 926.

Figure 10A:
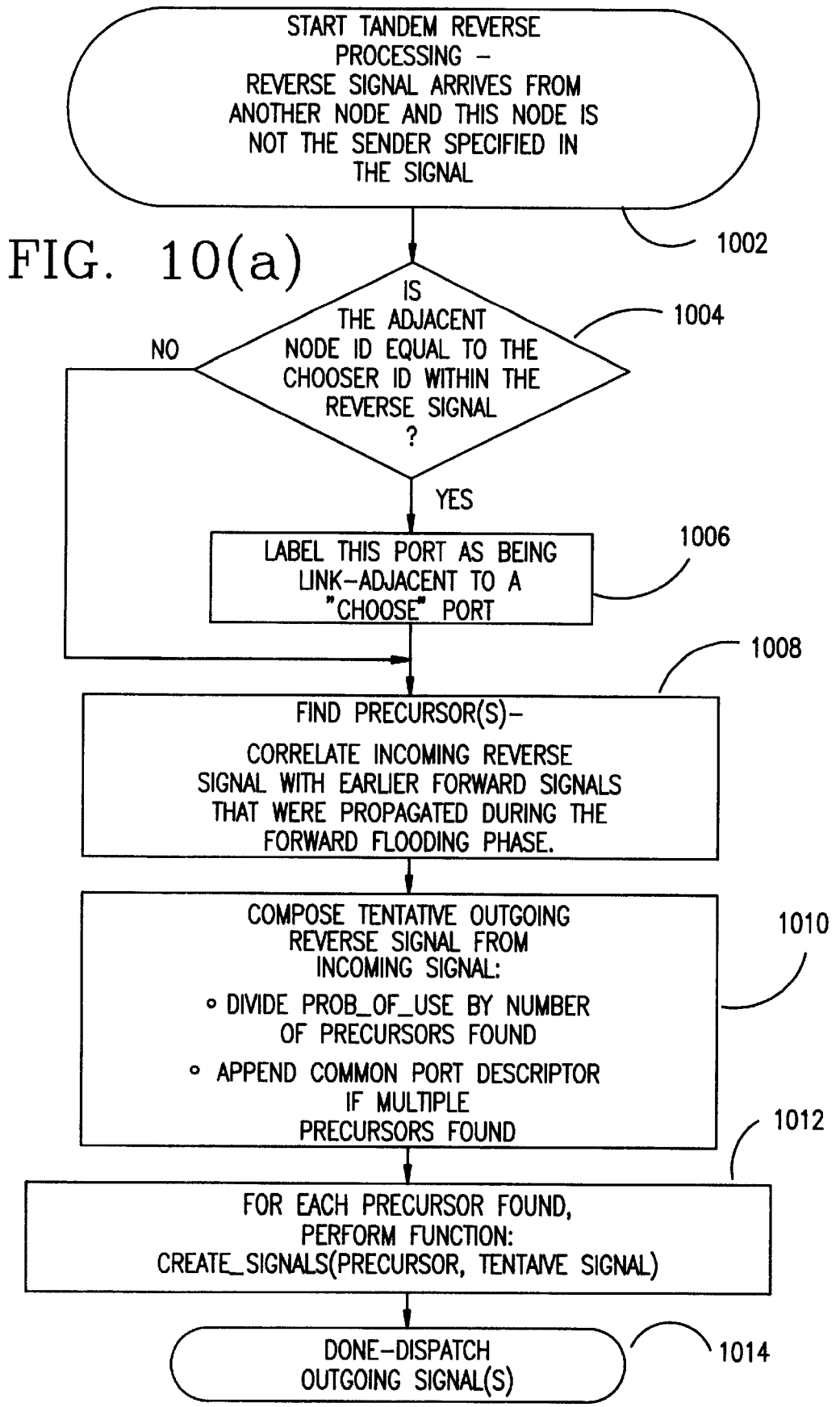

With reference now to FIG. 10A, a process is shown to be performed within Tandem nodes for each incoming reverse signal during the reverse signalling stage of the restoration protocol according to the present invention. Tandem Reverse processing begins within a given node in step 1002 on the condition that the reverse signal does not indicate the node as the Sender—otherwise Sender Reverse Processing would be appropriate as described later in FIG. 11. Steps 1004 and 1006 serve to label tandem ports that are connected via a link to a port of a Chooser that is labeled as a "choose" port. This practice is a feature of the present invention intended to minimize a "glare problem", as it is known to those skilled in the art. Applied to a point-to-point communications link, "glare" refers to the situation that both endpoints ascertain the link to be idle and then simultaneously attempt to initiate communications from either end of the link. In some cases, this causes an undesirable deadlock within the link. The label applied to a port in Step 1006 prevents later tandem processing from using the port for other purposes because the Chooser's need for the port is certain.

Step 1008 correlates the reverse signal with records of forward signals that were passed by the tandem earlier during the forward flooding stage. This is comparable to the finding of a precursor port as described in the cited prior art. The intent is to know how to propagate the reverse message back to the appropriate Sender along the same span that a corresponding forward signal from the Sender had traversed earlier. However, the present invention differs from the prior art in that a single reverse signal may have several corresponding precursors. Earlier in the discussion, block 714 of FIG. 7 was described to the handle forward flooding paths that converge within a tandem—some signals being withheld rather than propagated. Now a complementary logical function is introduced at this point to handle divergence of paths at the same tandem during the reverse phase. Whereas, during forward flooding, some signals may be "absorbed" in a holding buffer to avoid excessive flooding, the corresponding reverse signals are "regenerated". This is best understood by referring to the example network of FIG. 13. Of the two forward signals sent forth by Sender S in response to cut 1301, the signal dispatched from port S-2 is ultimately conducted to Chooser. The second signal issuing from port S-1 reaches Tandem TB after the other signal has already gone through. Tandem TB then sets the S-1 signal aside. This signal is not discarded entirely as it represents an alternate means to join nodes TB and S, should the need arise later due to contention or failure. During the reverse signalling stage, Tandem TB receives a single reverse signal from Chooser C, and uses the contents of the holding buffer to regenerate two outgoing reverse signals—one along TB-1 and another along TB-2. The probability of use imbedded in the reverse signal incident along TB-3 is divided by the number of regenerated signals—two in this case—to accurately reflect the likelihood that the process will require any one of the diverging paths.

Referring back to FIG. 10A, block 1010 refers to formulating a generic outgoing signal from the incoming signal by dividing the probability of use. This tentative outgoing signal is further modified by appending a common node descriptor (see element 529 in FIG. 5C) denoting the node ID and port number through which the incoming reverse signal entered the current node. By this appended information, signals along each divergent path indicate the point of path convergence.

In step 1012, a function CREATE_SIGNALS is performed upon each precursor identified in step 1008. The tentative outgoing signal composed in step 1010 is also input to the function for forming finalized outgoing signals.

After all precursors have been handled in step 1012, all outgoing signals created by the CREATE_SIGNALS function are dispatched in step 1014 and the process of a Tandem processing a reverse signal is completed.

Figure 10B:
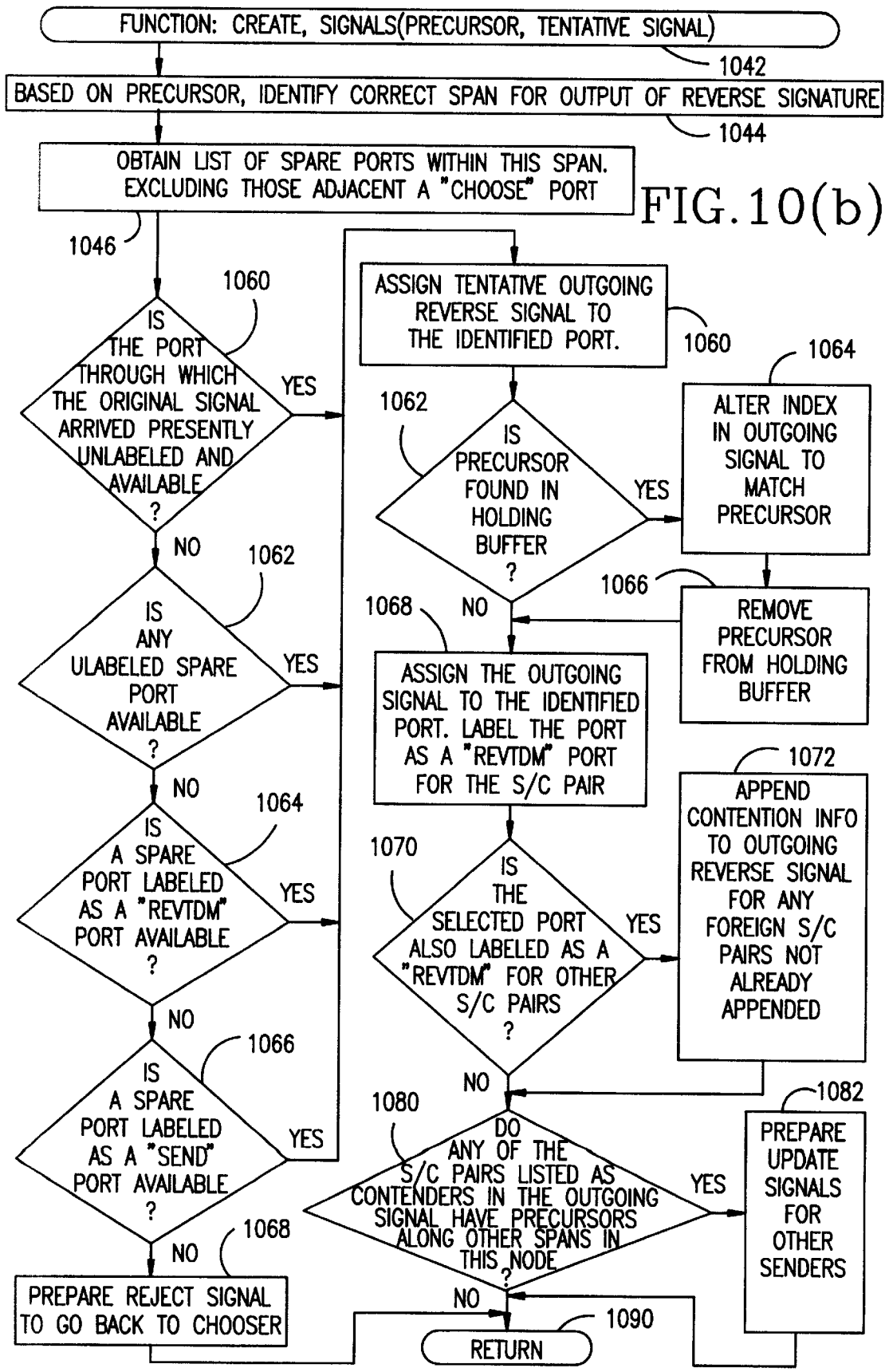

The function CREATE_SIGNALS executed in step 1012 is defined by the flow chart in FIG. 10B.

Block 1042 represents the entry point of the function through which are passed a forward signal precursor and a tentative outgoing signal. In step 1044, the span by which the precursor originally entered the node during the forward flooding is taken as the correct span upon which to return a corresponding reverse signal. With the appropriate "backtracking" span identified, step 1012 derives a working list of spare ports within the span. In order to avoid a predestined form of conflict, this list excludes any ports that are labeled as "Choose" ports or are link-adjacent to "Choose" ports.

Conditional steps 1050 through 1056 implement a preference in selecting a port in the return span. The most preferred port is the one through which the forward signal entered earlier. Unlabeled spare ports, ports labeled for "RevTandem" use, and ports labeled as "Send" ports for other processes are preferred next, in that order. If no ports can be found that meet any of these criteria, a reject signal composed as in FIG. 5F is sent back to the Chooser by step 1058 so that alternate reverse signals can be attempted.

If an acceptable port is identified by one of steps 1050 through 1056, a copy of the tentative outgoing reverse signal is assigned to the port in step 1060.

Steps 1062 through 1066 maintain the holding buffer as follows. Step 1062 ascertains whether or not the precursor resides in the holding buffer. In other words, step 1062 determines whether the given precursor represents a forward signal that was withheld or of one that was actually forwarded to the Chooser during forward flooding. Step 1064 customizes the tentative signal to form an appropriate reverse signal by changing the index field to match the index of the precursor. Step 1066 removes the precursor from the holding buffer so that it need not be handled by later processing.

The outgoing port is labeled in step 1068 for use as a "RevTandem" port for the Sender/Chooser pair specified in the reverse signal. As a key feature of the present invention, steps 1068 through 1072 function together within the Tandem logic to detect contention and to assure that competing restorative processes are aware of one another. Step 1070 determines if the selected port has already been designated as a "RevTandem" port by other restoration processes. If so, then for each other process attempting to reserve the port, a contention descriptor (data element 526 in FIG. 5C) is appended to the outgoing signal in step 1072. This appended contention information is used later by the Sender in making final selection of restoration paths.

The role of step 1080 implements the logic discussed above in relation to update signal 530 and in conjunction with FIG. 14. Step 1080 involves determining when to originate such an update signal 530. The role of step 1080 is further explained as follows. Detection of contention for ports by separate processes during reverse signalling implies that, during the forward flooding stage, some paths that carried forward signals from separate Sender nodes converged at some point. The first tandem node at which the paths converged during forward flooding will, during reverse signalling, be the last common node by which the separate Senders can receive transmitted signals. During reverse signalling according to the present invention, this last common node plays an important role in keeping diverse Senders notified of contention detected by Tandems. Step 1080 determines if the current Tandem node is a point of reverse path divergence for multiple Senders. In one preferred embodiment, this determination is made by examining each contention descriptor in the outgoing signal and attempting to find a corresponding forward signal precursor that would have been generated during forward flooding. This search for a precursor is similar to step 1008 of FIG.

10A described above. If a precursor for a contending Sender/Chooser pair is found within a different span than is presently selected as the return span, the current Tandem is assumed to be point of divergence or, restated, the current Tandem is the last chance while propagating the reverse signal to communicate contention awareness to a foreign Sender.

If step 1080 finds that the current Tandem is a divergent point, step 1082 composes an update signal bearing the same contention information as the outgoing reverse signal composed in steps 1060 and 1068.

As explained earlier, this processing keeps multiple Senders apprised of changing contention information throughout the reverse signalling stage. Finally, the function concludes in step 1090 and processing returns to the point from which the function was invoked.

In accordance with the present invention, the Sender collects reverse signals and update signals with the goal of making a final selection of restoration paths. This contrasts with the basic SHN approach in which the Chooser node makes the decision on how to utilize restoration resources. The advantage of the present invention over the prior art is that the second stage of signalling allows for contention detection and, consequently, the Senders have adequate information to make best use of restoration paths in the final connection stage of processing.

Figure 11:
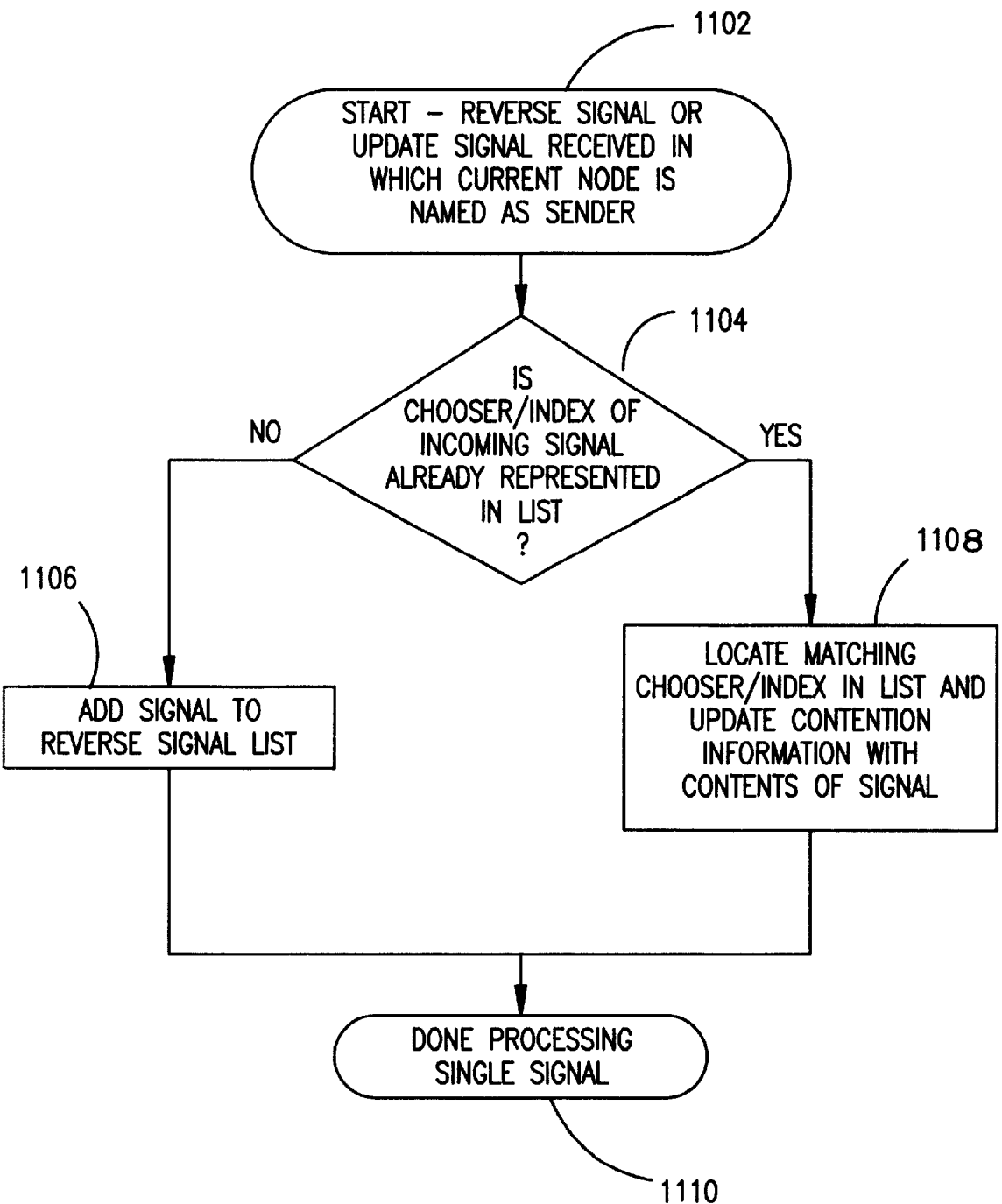

FIG. 11 depicts the function of a Sender node in accumulating a list of data as reverse and update signals trace back through the network and reach the Sender. Step 1102 starts the process upon the receipt of a signal in which the Sender ID field equals the current node. Step 1104 compares the Chooser/Index of the incoming signal to those already represented in the signal list. Note that in step 1104, the Sender is always the current node, having already been qualified by step 1102. If the Chooser/Index combination does not appear in the list, the new signal is added to the list in step 1106 including all pertinent signal contents such as contention information. If step 1104 finds the Chooser/Index in the list, step 1108 overwrites the contention data in the existing list entry with that found in the incoming signal. Step 1110 represents the end of Sender Reverse processing for a single signal.

Figure 12A:
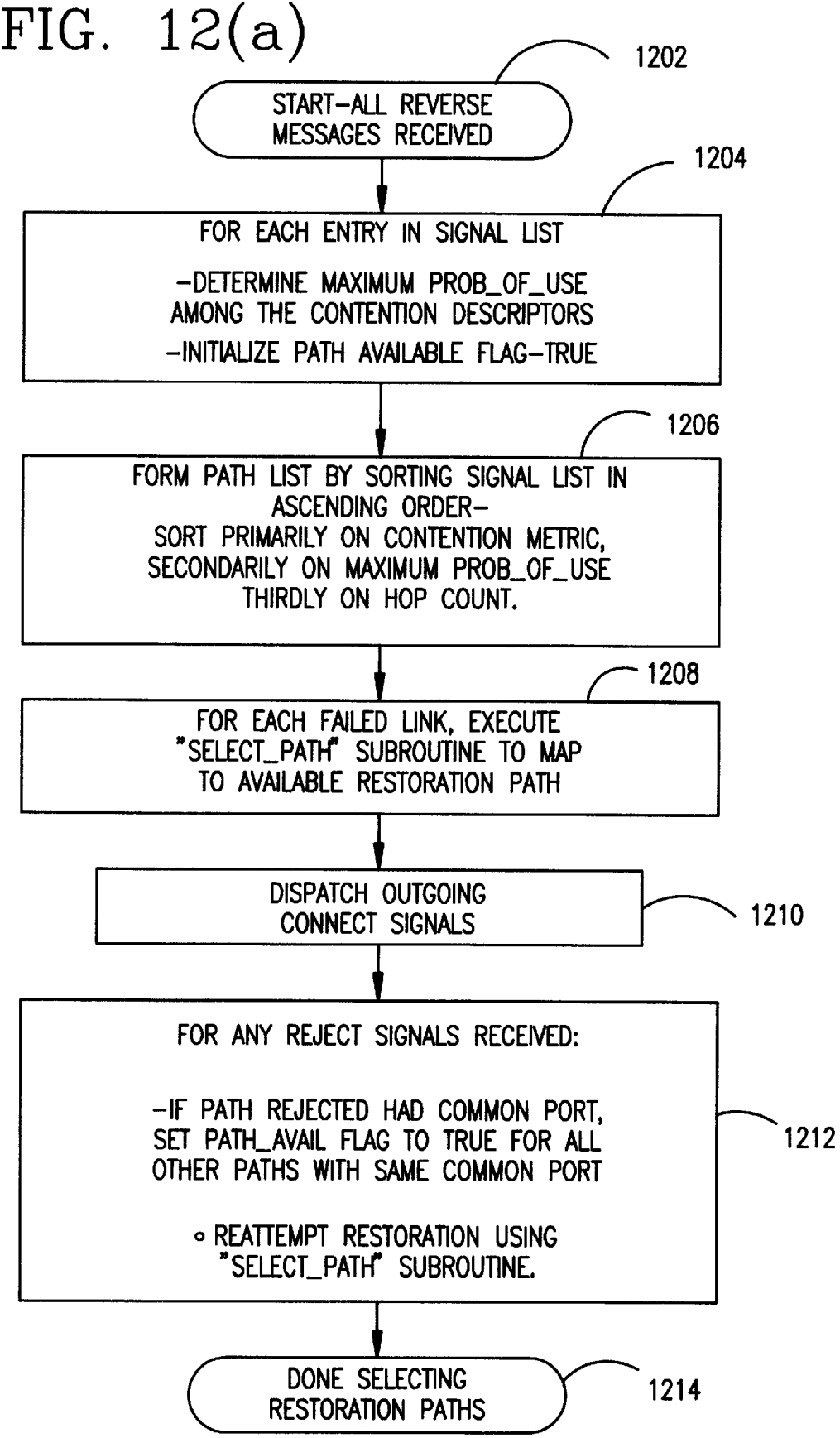
FIG. 12 is a flow chart depicting the logical steps executed by the Sender in making final path decisions and handling reject messages in accordance with the present invention.

Referring to FIG. 12 of the drawings, FIG. 12A is a flow chart of logical steps initiating the third and final stage of the restoration protocol according to the present invention. By these logical steps, the Sender makes a final selection of restoration paths assigned to restore particular failed links, and implements the selected paths within the network by transmitting connect signals.

Step 1202 begins within a Sender node after an expected number or adequate number of reverse signals have been received during the reverse sender processing outlined in FIG. 10. In similar manner to block 902, any number of ways to establish the completion of reverse signalling may be practiced in step 1202 for the purposes of the present invention.

In step 1204, the list of reverse signals accumulated during the Sender Reverse processing is modified. Specifically, each entry on the signal list is prepended with a flag i.e. a binary variable, called PATH_AVAIL, to indicate whether the path is available for use. For each entry, this flag is initially set to TRUE indicating that the path denoted by the entry is available to be assigned for restoring a failed link.

Also in step 1204, in accordance with one embodiment of the present invention, any contention descriptors for each entry are summarized by determining the maximum probability of use listed among the descriptors.

In step 1206, the modified signal list is further transformed into a path list by executing a sort upon the list. This involves sorting primarily on the contention metric within each signal—entries with lowest contention metrics should be at the top of the list as being preferred for restoration purposes. Secondarily, the sort is done based on the maximum probability of use summary for each entry as derived in step 1204.

For the same contention metric, entries with lower probability of use by other processes should appear higher in the path list. Finally, the list is sorted based on hop count so that, contention factors being equal, the preference is for shorter implemented path lengths.

After creating the ordered restoration path list, step 1208 calls a subroutine for each failed link to assign the failed link to a restoration path. This more-or-less amounts to one-to-one mapping of failed links to restoration paths, starting from the top of the path list and working downward. Special handling is required, however, for common port descriptors and for reject signals as described below.

Figure 12B:
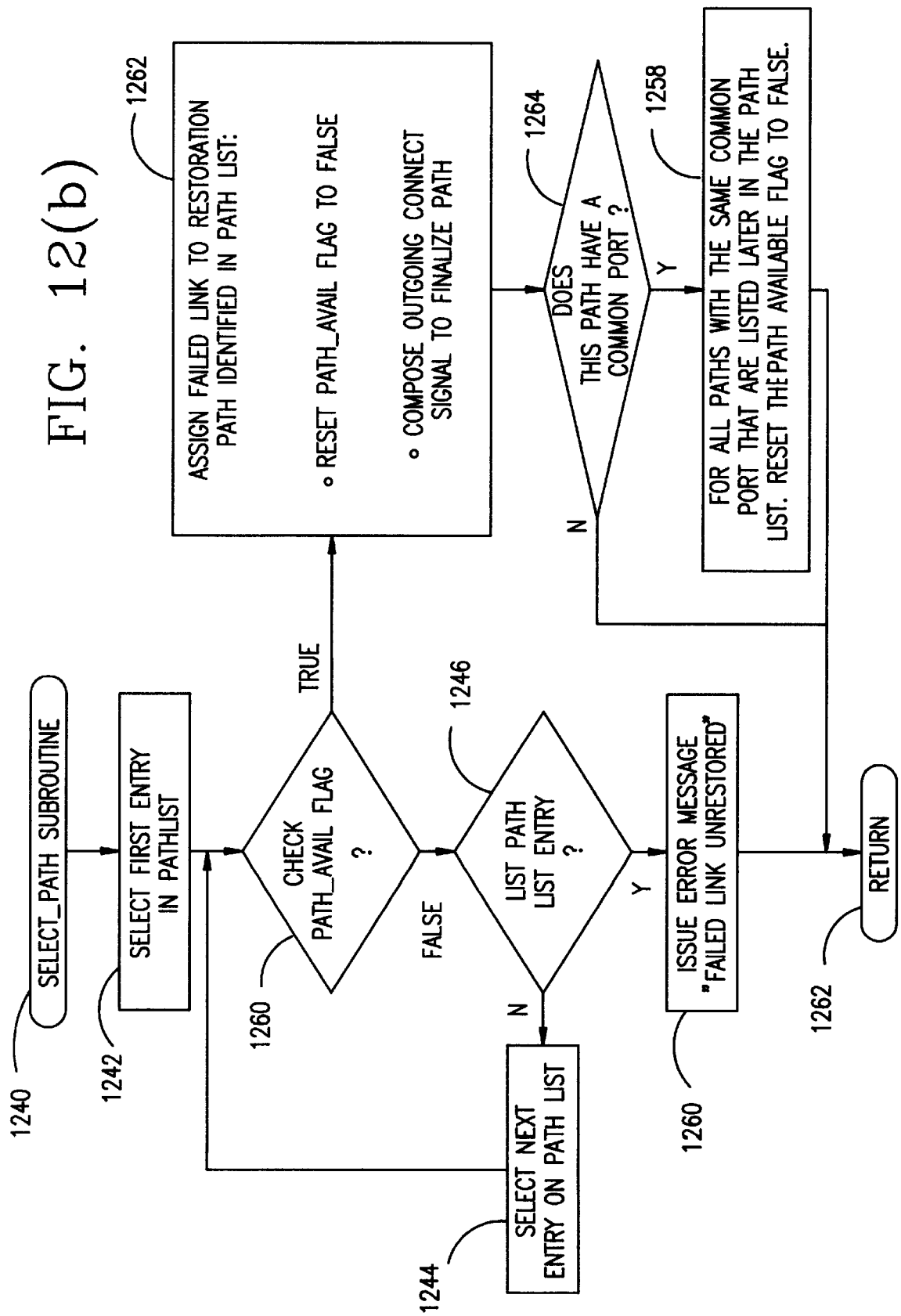

Referring to FIG. 12B, a flow chart is shown describing the steps that constitute the "SELECT_PATH" subroutine referenced in blocks 1208 and 1212 of FIG. 12A. The goal of the SELECT_PATH logic is to assign a given failed link to a candidate restoration path listed in the path list of step 1206. The subroutine starts at step 1240 and processing follows in the context of a specific failed link that needs to find a restoration path. Step 1242 specifies starting at the top of the path list for each invocation of the routine. The top entry in the list is selected at this point. Step 1250 checks the PATH_AVAIL flag introduced earlier to determine whether the path entry is still assignable. If not, then steps 1246 and 1244 execute a loop to step through all the path list entries until either step 1250 finds an assignable path, or the path list is exhausted. If the end of the path list is reached in step 1246, then no path list entry could be used for the given failed link and step 1260 performs some useful notification such as issuing an error message to some error handling process outside the scope of the present invention.

Upon step 1250 determining a path list entry available for assignment to restore the given failed link, such an assignment is secured in step 1252 by setting the PATH_AVAIL flag for the path list entry to FALSE and composing an outgoing connect signal to implement the path.

Steps 1254 and 1256 are needed for entries in the path list that carry an associated common node/port descriptor. Such a descriptor would have been appended during tandem reverse processing and would persist as an appended part of an entry which is, in essence, a modified version of the reverse signal. Step 1254 determines if the path has an appended common node/port descriptor. If not, then the subroutine returns in step 1262. Step 1256 is executed for entries with common port descriptors. Step 1256 searches the contents of the path list and renders all other paths with the same common node/port descriptor unavailable for use by the Sender. These other paths are made unavailable by setting the PATH_AVAIL flag to FALSE.

Returning now to FIG. 12A, step 1210 is executed to dispatch all outgoing connect signals created by one or more iterations of the SELECT_PATH routine in step 1208. In some cases, outgoing connect signals may no longer be possible to implement due to further network failure or unresolvable contention. Other nodes that cannot comply with a connect signal send a reject signal back to the Sender.

Step 1212 summarizes the subsequent actions by a Sender node in response to reject signals. Basically, the Sender applies the SELECT_PATH routine to the path list to find the next preferable path in the list. Additionally, due to common node/port handling, a reject signal must also result in reactivation of other common port paths that may have been disabled earlier by step 1256. Of course, the failed path that was rejected remains unavailable.

Finally, step 1214 indicates the end of Sender Connect processing as well as the end of one instance of a restorative process according to the present invention.

While the present invention has been particularly shown and described with reference to a preferred embodiment, it will be understood by those skilled in the art that changes in form, detail, and application may be made therein without departing from the spirit and scope of the invention as defined in the appended claims.

What is claimed is:

1. In a telecommunications network having a plurality of nodes interconnected by a plurality of spans each having working and spare links, a method of restoring traffic disrupted by at least one failed link, comprising the steps of:
   (a) designating one of a pair of nodes bracketing said one failed link a sender node and an other of said pair of nodes a chooser node, and nodes interconnecting said sender and chooser nodes via said plurality of spans tandem nodes;
   (b) transmitting restoration signals from said sender node to said chooser node along said interconnected tandem nodes, each of said restoration signals including data identifying said sender and chooser nodes, index data and probability data indicative of the likelihood that the path traversed by said each restoration signal is to be used for restoring the disrupted traffic;
   (c) adding to said each restoration signal contention data as said each restoration data traverses along each one of said tandem nodes;
   (d) after receiving said restoration signals for a predetermined time period, said chooser node transmitting reverse restoration signals to backtrack the restoration paths traversed by said received restoration signals, said reverse restoration signals each including particular contention and probability of use data derived from the data carried by a corresponding restoration signal received by said chooser node; and
   (e) upon receipt of an expected number of said reverse restoration signals, said sender node reviewing the respective contention and probability of use data attached to each of said received reverse restoration signals to select an optimal restoration path for restoring the disrupted traffic.

2. The method of claim 1, further comprising the step of: appending contention data relating to each tandem node to each reverse restoration signal passing through said each tandem node, said each tandem node generating and sending an update message to any other sender node of other sender and chooser pairs not bracketing said one failed link.

3. The method of claim 1, further comprising the step of: effecting said sender node to
   i) assess the number of failed links in said telecommunications network before said sender node transmits restoration signals to said chooser node;
   ii) identify a span, and ports and spare links within said identified span, to which restoration signals may be transmitted;
   iii) limit the number of restoration signals to be transmitted along spare links in said span to the number of failed links assessed;
   iv) select a port and a spare link in said span for transmitting each restoration signal;
   v) repeat steps (ii) to (iv) for each span connected to said sender node.

4. The method of claim 1, wherein said step (b) further comprises the step of:
   providing said probability data to said each restoration signal by adding a FAILED field and a FLOODED field to said each restoration signal, said FAILED and FLOODED fields together providing an indication of the likelihood that a prospective path traversed by said each restoration signal will actually be needed for restoring the disrupted traffic.

5. The method of claim 1, upon receipt of a restoration signal at a port of a span connected to said each tandem node, said each tandem node
   updating a contention metric associated with said port to indicate the probability that said port is to be used for restoration of the disrupted traffic;
   maintaining a record of restoration signals dispatched along each span connected to said each tandem node for said pair of sender and chooser nodes; and
   selecting the port with the lowest contention metric as an output port for forwarding said received restoration signal to nodes downstream of said each tandem node.

6. The method of claim 5, said each tandem node further curtailing further forwarding of restoration signals to a particular span if the number of restoration signals dispatched along said particular span connected to said each tandem node already equals to the number of failed links assessed;
   storing the curtailed restoration signals in a holding store; and
   updating the count of the number of restoration signals sent out along each span for each pair of sender and chooser nodes.

7. The method of claim 6, each of said tandem nodes, upon receipt of each reverse restoration signal, further
   correlating the restoration path of said reverse restoration signal with a corresponding restoration signal that had traversed through said each tandem node;
   transmitting said reverse restoration signal to the span from which said corresponding restoration signal had reached said each tandem node;
   generating a copy of said reverse restoration signal for each curtailed restoration signal stored in said holding store, a percentage of probability of use being allocated for each said copy; and
   transmitting any copy of said reverse restoration signal along the restoration path associated with the curtailed restoration signal.

8. The method of claim 1, wherein said each restoration signal includes a chooser ID and each node of said network includes a node ID, further comprising the step of:
   determining said chooser node to have been reached by said each restoration signal if the chooser ID of said each restoration signal is the same as the node ID of the node in receipt of said each restoration signal.

9. The method of claim 1, in receipt of said each restoration signal, said chooser node further
   updating the port in the span from which said each restoration signal is received by said chooser node;

extracting sender, chooser and index data carried by said each received restoration signal;

recording the sender, chooser and index data for said each received restoration signal in a table store; and converting the sender, chooser and index data of said each received restoration signal into a unique identifier for a candidate restoration path.

10. The method of claim 9, said chooser node further determining if a candidate restoration path is already in said table store;

keeping a count of the number of times restoration signals from a candidate restoration path is received by said chooser node;

retrieving from said table store the restoration signal having the lowest hop count;

calculating a probability of use metric for the restoration path of said retrieved restoration signal; and designating said restoration path with the probability of use metric as the chosen restoration path.

11. The method of claim 10, further comprising the steps of:

transmitting from said chooser node a reverse restoration signal including said probability of use metric to said chosen restoration path from a best available port of the span from which said retrieved restoration signal was received.

12. The method of claim 11, wherein said step (e) further comprises the step of:

transmitting an update signal to tandem nodes not along said optimal restoration path for updating the availability of the spans and ports associated with those tandem nodes to prevent contention problems.

13. The method of claim 1, each of said tandem nodes, upon receipt of each reverse restoration signal, further correlating the restoration path of said reverse restoration signal with a corresponding restoration signal that had traversed through said each tandem node; and transmitting said reverse restoration signal to the span from which said corresponding restoration signal had reached said each tandem node.

14. The method of claim 1, further comprising the step of:

said sender node collecting all reverse restoration signals for selecting an optimal restoration path based on the lowest probability of use, the lowest hop count or the shortest implemented restoration path length.

15. A method of restoring communications in a telecommunications network having a plurality of nodes interconnected by a plurality of spans each having working and spare links, at least one of said links having failed, comprising the steps of:

(a) designating one of a pair of nodes bracketing said one failed link a sender node and an other of said pair of nodes a chooser node, and nodes interconnecting said sender and chooser nodes via said plurality of spans tandem nodes;

(b) said sender node
  i) assessing the number of failed links;
  ii) identifying a span and spare ports within said span for flooding restoration signals;
  iii) limiting the number of restoration signals to be transmitted along spare links in said span to the number of failed links assessed;
  iv) selecting an output port for each restoration signal to be sent;
  v) repeating steps ii to iv for each span connected to said sender node;
  vi) transmitting at least one restoration signal to said chooser node through each output port of said each span, each of said restoration signals including data identifying said sender and chooser nodes, and probability data indicative of the likelihood that the path traversed by said one restoration signal is to be used for restoring the communications carried by said one failed link;

(c) each of said tandem nodes, upon receipt of a restoration signal at a port of a span connected thereto,
  updating a contention metric associated with said port to indicate the probability that said port is to be used for restoration of the disrupted traffic;
  maintaining a record of restoration signals dispatched along each span connected to said each tandem node for said pair of sender and chooser nodes;
  selecting the port with the lowest contention metric as an output port for forwarding received restoration signals to nodes downstream from said each tandem node;

(d) said chooser node, after receiving restoration signals for a predetermined period of time,
  choosing from among the received restoration signals one having a corresponding restoration path;
  calculating a probability of use metric for said chosen restoration path;
  transmitting a reverse restoration signal including a probability of use metric to said chosen restoration path, said reverse restoration signal including particular contention and probability of use data derived from data carried by said chosen restoration signal;

(e) said sender node, upon receipt of an expected number of said reverse restoration signal, reviewing the respective contention and probability of use data attached to each of said received reverse restoration signals to select an optimal restoration path for restoring the communications carried by said failed link.

16. The method of claim 15, wherein said probability data of said each restoration signal sent out by said sender node comprises a FAILED data field and a FLOODED data field which together provides a ratio for indicating the likelihood that a prospective path traversed by said each restoration signal will actually be needed for restoring the communications carried by said failed link.

17. The method of claim 15, wherein said step (c) further comprises the steps of:

said tandem node curtailing further forwarding of restoration signals to a particular span if the number of restoration signals dispatched along said particular span connected to said tandem node already equals to the number of failed links assessed; and storing the curtailed restoration signals in a holding store.

18. The method of claim 15, further comprising the step of:

appending contention data relating to each tandem node to each reverse restoration signal passing through said each tandem node, said each tandem node generating and sending an update message to any other sender node of other sender and chooser pairs not bracketing said one failed link.

19. The method of claim 15, wherein said each restoration signal includes a chooser ID and each node of said network includes a node ID, further comprising the step of:

determining said chooser node to have been reached by said each restoration signal if the chooser ID of said each restoration signal is the same as the node ID of the node in receipt of said each restoration signal.

20. In a telecommunications network having a plurality of nodes interconnected by a plurality of spans each having working and spare links, a system for restoring traffic disrupted by at least one failed link, one of a pair of nodes bracketing said one failed link being designated a sender node and an other of said pair of nodes being designated a chooser node, and nodes interconnecting said sender and chooser nodes via said plurality of spans being designated tandem nodes, said system comprising:

processor switch means in said sender node for flooding restoration signals to said chooser node along said interconnected tandem nodes, each of said restoration signals including data identifying said sender and chooser nodes, index data and probability data indicative of the likelihood that the path traversed by said each restoration signal is to be used for restoring the disrupted traffic;

processor switch means in each of said tandem nodes for adding to said each restoration signal contention data as said each restoration data traverses along said each tandem node; and processor switch means in said chooser node for receiving said restoration signals, after receiving said restoration signals for a predetermined time period, said chooser node processor switch means transmitting reverse restoration signals to backtrack the restoration paths traversed by said received restoration signals, said reverse restoration signals each including particular contention and probability of use data derived from the data carried by a corresponding restoration signal received by said chooser node;

upon receipt of an expected number of said reverse restoration signals, said sender node processor switch means reviewing the respective contention and probability of use data attached to each of said received reverse restoration signals to select an optimal restoration path for restoring the disrupted traffic.

21. The system of claim 20, wherein the processor switch means of said each tandem node further appends contention data relating to each tandem node to each reverse restoration signal passing through said each tandem node, and generates and sends an update message to any other sender node of other sender and chooser pairs not bracketing said one failed link.

22. The system of claim 20, wherein said processor switch means of said sender node further i) assesses the number of failed links in said telecommunications network before transmitting restoration signals to said chooser node;

ii) identifies a span, and ports and spare links within said identified span, to which restoration signals may be transmitted;

iii) limits the number of restoration signals to be transmitted along spare links in said span to the number of failed links assessed;

iv) selects a port and a spare link in said span for transmitting each restoration signal; and v) repeats steps (ii) to (iv) for each span connected to said sender node.

23. The system of claim 20, wherein said probability data is provided to said each restoration signal as a FAILED field and a FLOODED field, said FAILED and FLOODED fields together providing an indication of the likelihood that a prospective path traversed by said each restoration signal will actually be needed for restoring the disrupted traffic.

24. The system of claim 20, wherein said each tandem node is connected to at least one span having a plurality of ports, and wherein upon receipt of a restoration signal at a port of said one span, said each tandem node processor switch means updates a contention metric associated with said port to indicate the probability that said port is to be used for restoration of the disrupted traffic;

maintains a record of restoration signals dispatched along each span connected to said each tandem node for said pair of sender and chooser nodes; and selects the port with the lowest contention metric as an output port for forwarding said received restoration signal to nodes downstream thereof.

25. The system of claim 20, wherein said each tandem node processor switch means further comprises a holding store, the processor switch means of said each tandem node curtailing further forwarding of restoration signals to a particular span if the number of restoration signals dispatched along said particular span connected to said each tandem node already equals to the number of failed links assessed, storing the curtailed restoration signals in said holding store, and updating the count of the number of restoration signals sent out along each span for each pair of sender and chooser nodes.

26. The system of claim 20, wherein the processor means of said each tandem node along said optimal restoration path transmits an update signal to other tandem nodes for updating the availability of the spans and ports associated with said each tandem node to prevent contention problems.

27. The system of claim 20, wherein said sender node processor switch means collects all reverse restoration signals from said each tandem nodes for selecting said optimal restoration path based on the lowest probability of use, the lowest hop count or the shortest implemented restoration path length.

* * * * *